US012440712B2

(12) United States Patent
Ryczek

(10) Patent No.: US 12,440,712 B2
(45) Date of Patent: Oct. 14, 2025

(54) VARIABLE FLOW SUPPRESSION SYSTEM

(71) Applicant: Tyco Fire Products LP, Lansdale, PA (US)

(72) Inventor: Chad Lee Ryczek, Oconto Falls, WI (US)

(73) Assignee: Tyco Fire Products LP, Cranston, RI (US)

( * ) Notice: Subject to any disclaimer, the term of this patent is extended or adjusted under 35 U.S.C. 154(b) by 901 days.

(21) Appl. No.: 17/602,141

(22) PCT Filed: Apr. 10, 2020

(86) PCT No.: PCT/IB2020/053450
§ 371 (c)(1),
(2) Date: Oct. 7, 2021

(87) PCT Pub. No.: WO2020/208605
PCT Pub. Date: Oct. 15, 2020

(65) Prior Publication Data
US 2022/0143443 A1 May 12, 2022

Related U.S. Application Data

(60) Provisional application No. 62/832,707, filed on Apr. 11, 2019.

(51) Int. Cl.
*A62C 35/13* (2006.01)
*A62C 99/00* (2010.01)

(52) U.S. Cl.
CPC .......... *A62C 35/13* (2013.01); *A62C 99/0045* (2013.01)

(58) Field of Classification Search
CPC ......... A62C 35/13; A62C 35/58; A62C 35/64; A62C 35/645; A62C 99/0045;
(Continued)

(56) References Cited

U.S. PATENT DOCUMENTS 4,042,521 A * 8/1977 Dunn ................. A62C 99/0045 252/7
5,845,714 A * 12/1998 Sundholm .............. A62C 31/05 169/46
(Continued)

FOREIGN PATENT DOCUMENTS

CN 102000406 A 4/2011
CN 104780981 A 7/2015
(Continued)

OTHER PUBLICATIONS

International Search Report and Written Opinion for Application No. PCT/IB2020/053450 dated Sep. 3, 2020, 18 pages.

*Primary Examiner* — Arthur O. Hall
*Assistant Examiner* — Juan C Barrera
(74) *Attorney, Agent, or Firm* — Foley & Lardner LLP

(57) ABSTRACT

A fire suppression system includes a delivery system that is configured to receive fire suppressant agent from a reservoir and provide the fire suppressant agent to an area at a flow rate, according to some embodiments. In some embodiments, the delivery system is further configured to provide a first quantity of fire suppressant agent to an area at a first flow rate during a first time interval. In some embodiments, the delivery system is further configured to provide a second quantity of fire suppressant agent to the area at a second flow rate during a second time interval. In some embodiments, the second flow rate is less than the first flow rate. In some embodiments, the first and the second quantity of fire suppressant agent are provided to the area via a nozzle.

6 Claims, 12 Drawing Sheets

(58) Field of Classification Search
CPC ............. A62C 35/023; Y10T 137/4673; Y10T 137/469; Y10T 137/2572
USPC ............. 169/47, 9, 16; 222/129, 129.2, 133; 137/255, 111, 112, 114
See application file for complete search history.

(56) References Cited

U.S. PATENT DOCUMENTS

| | | | | | |
|---|---|---|---|---|---|
| 5,992,530 | A * | 11/1999 | Sundholm | A62C 35/023 16/5 |
| 6,082,464 | A * | 7/2000 | Mitchell | F02C 7/25 169/45 |
| 6,095,251 | A | 8/2000 | Mitchell et al. | |
| 2005/0150663 | A1* | 7/2005 | Fabre | A62C 13/66 169/5 |
| 2005/0183869 | A1 | 8/2005 | Lazzarini | |
| 2011/0186312 | A1* | 8/2011 | Gatsonides | A62C 35/645 169/46 |
| 2012/0168184 | A1 | 7/2012 | Enk, Sr. | |
| 2014/0158382 | A1 | 6/2014 | Ferguson et al. | |
| 2015/0174437 | A1 | 6/2015 | Enk | |
| 2015/0231431 | A1* | 8/2015 | Sandahl | A62C 35/023 700/283 |
| 2015/0251031 | A1 | 9/2015 | Sandahl et al. | |
| 2016/0263410 | A1* | 9/2016 | Enk, Sr. | A62C 99/0036 |
| 2016/0332012 | A1* | 11/2016 | Lenkeit | A62C 37/44 |
| 2017/0014655 | A1* | 1/2017 | Gatsonides | B64D 45/00 |
| 2017/0021213 | A1* | 1/2017 | Ryczek | A62C 35/023 |

FOREIGN PATENT DOCUMENTS

| | | | |
|---|---|---|---|
| EP | 0 878 212 | A2 | 11/1998 |
| EP | 3 117 875 | A1 | 1/2017 |
| EP | 3 228 364 | A1 | 10/2017 |
| GB | 2 325 159 | A | 11/1998 |
| JP | 11-221297 | A | 8/1999 |
| JP | H11-221279 | A | 8/1999 |
| WO | WO-2014/047574 | A2 | 3/2014 |

* cited by examiner

VARIABLE FLOW SUPPRESSION SYSTEM

CROSS-REFERENCE TO RELATED PATENT APPLICATION

This application claims the benefit and priority to U.S. Provisional Patent Application No. 62/832,707, filed Apr. 11, 2019, the entire disclosure of which is incorporated by reference herein.

BACKGROUND

Fire suppression systems are commonly used to protect an area and objects within the area from fire. Fire suppression systems can be activated manually or automatically in response to an indication that a fire is present nearby (e.g., an increase in ambient temperature beyond a predetermined threshold value, etc.). Once activated, fire suppression systems spread a fire suppressant agent throughout the area. The fire suppressant agent then extinguishes or prevents the growth of the fire. Various sprinklers, nozzles, and dispersion devices are used to disperse the fire suppressant agent throughout the area.

SUMMARY

One implementation of the present disclosure is a fire suppression system. The fire suppression system includes a delivery system that is configured to receive fire suppressant agent from a reservoir and provide the fire suppressant agent to an area at a flow rate, according to some embodiments. In some embodiments, the delivery system is further configured to provide a first quantity of fire suppressant agent to an area at a first flow rate during a first time interval. In some embodiments, the delivery system is further configured to provide a second quantity of fire suppressant agent to the area at a second flow rate during a second time interval. In some embodiments, the second flow rate is less than the first flow rate. In some embodiments, the first and the second quantity of fire suppressant agent are provided to the area via a nozzle.

In some embodiments, the system includes a controller configured to control operation of the delivery system to provide the first quantity of fire suppressant agent in response to detecting a fire.

In some embodiments, the delivery system is configured to automatically provide the second quantity of fire suppressant agent to the area at the second flow rate over the second time interval in response to discharging the first quantity of fire suppressant agent, automatically providing the fire suppressant agent at the first flow rate for a predetermined amount of time, reaching an end of the first time interval, or detecting a temperature change at the area.

In some embodiments, the fire suppression system is a restaurant fire suppression system and is configured to provide the first quantity of fire suppressant agent and the second quantity of fire suppressant agent to a top surface of a fluid including fat or oil. In some embodiments, wherein providing the first quantity of fire suppressant agent to the top surface of the fluid results in a formation of a crust over an entirety of the top surface of the fluid and providing the second quantity of fire suppressant agent to the top of the crust results in maintaining a thickness of the crust as the fluid cools.

In some embodiments, the fire suppression system is a vehicle fire suppression system. The vehicle fire suppression system may include a heated element. In some embodiments, the first quantity of the fire suppressant agent is provided to the heated element to initially cool the heated element and the second quantity of the fire suppressant agent is provided to the heated element to maintain cooling of the heated element over the second time interval.

In some embodiments, the system further includes at least one of an optical sensor configured to monitor light emitted at the area or a temperature sensor configured to monitor temperature at the area. In some embodiments, the delivery system is configured to activate to provide the first quantity and the second quantity of the fire suppressant agent in response to sensor data obtained from the optical sensor or the temperature sensor.

In some embodiments, the delivery system includes a first tank, a first cartridge, a second tank, a second cartridge, a valve, and a controller. In some embodiments, the first tank is configured to store the first quantity of the fire suppressant agent. In some embodiments, the first cartridge is configured to pressurize the first quantity of the fire suppressant agent in the first tank at a first pressure. In some embodiments, the second tank configured to store the second quantity of the fire suppressant agent. In some embodiments, the second cartridge configured to pressurize the second quantity of the fire suppressant agent in the second tank at a second pressure different than the first pressure. In some embodiments, the valve is fluidly coupled with outlet conduits of both the first tank and the second tank. In some embodiments, the controller is operatively coupled with the valve and configured to operate the valve to transition between a first position to provide the first quantity of the fire suppressant agent from the first tank to the area at the first flow rate during the first time interval and a second position to provide the second quantity of the fire suppressant agent from the second tank to the area at the second flow rate during the second time interval.

In some embodiments, the delivery system includes a tank, a tank, a first cartridge, a second cartridge, a valve, and a controller. In some embodiments, the tank is configured to store the first quantity and the second quantity of the fire suppressant agent. In some embodiments, the first cartridge includes a first propellant pressurized to a first pressure. In some embodiments, the second cartridge includes a second propellant pressurized to a second pressure. In some embodiments, the valve is selectably fluidly coupled with the first cartridge, the second cartridge, and the tank. In some embodiments, the controller is operatively coupled with the valve and configured to transition the valve between a first position to fluidly couple the first cartridge with the tank to discharge the first quantity of the fire suppressant agent from the tank to the area at the first flow rate over the first time interval, and a second position to fluidly couple the second cartridge with the tank to discharge the second quantity of the fire suppressant agent from the tank to the area over the second time interval.

In some embodiments, the delivery system includes a tank, a cartridge, a regulator, and a controller. In some embodiments, the tank is configured to store the first quantity and the second quantity of the fire suppressant agent. In some embodiments, the cartridge is fluidly coupled with an inlet of the tank and configured to store a propellant to pressurize the tank. In some embodiments, the regulator is fluidly coupled with an outlet of the tank. In some embodiments, the controller is configured to operate the regulator to provide the first quantity of the fire suppressant agent at the first flow rate to the area over the first time interval and provide the second quantity of the fire suppressant agent at the second flow rate to the area over the second time interval.

In some embodiments, the delivery system includes a tank, a pump, and a controller. In some embodiments, the tank is configured to store the first quantity and the second quantity of the fire suppressant agent. In some embodiments, the pump is fluidly coupled with the tank. In some embodiments, the controller is configured to operate the pump to provide the first quantity of the fire suppressant agent from the tank to the area at the first flow rate over the first time interval and provide the second quantity of the fire suppressant agent from the tank to the area at the second flow rate over the second time interval.

Another implementation of the present disclosure is a method for suppressing a fire at an area. In some embodiments, the method includes providing a first quantity of a fire suppressant agent to the area over a first time interval at a first flow rate. In some embodiments, the method further includes providing a second quantity of the fire suppressant agent to the area over a second time interval at a second flow rate that is less than the first flow rate. In some embodiments, providing the first quantity of the fire suppressant agent over the first time interval at the first flow rate forms an initial crust of the fire suppressant agent to initially suppress the fire. In some embodiments, providing the second quantity of the fire suppressant agent over the second time interval at the second flow rate forms additional crust of the fire suppressant agent to maintain suppression of the fire and reduce a likelihood of re-ignition of the fire.

In some embodiments, the area is a kitchen oil fryer. In some embodiments, the first quantity of the fire suppressant agent is provided over the first time interval at the first flow rate to initially form a crust and trap gases beneath the crust and the second quantity of the fire suppressant agent is provided over the second time interval at the second flow rate to maintain a minimum thickness of the crust to reduce a likelihood of oil burning through the crust and re-igniting the fire.

In some embodiments, the area includes a heated element. In some embodiments, the first quantity of the fire suppressant agent is provided to the heated element to initially form a crust over the heated element and initially cool the heated element and the second quantity of the fire suppressant agent is provided to the heated element to maintain a minimum thickness of the crust over the heated element to reduce a likelihood of the heated element re-igniting the fire.

In some embodiments, the method further includes monitoring temperature or light emission at the area. In some embodiments, the method further includes providing the first quantity of the fire suppressant agent and the second quantity of the fire suppressant agent in response to detecting the fire based on the temperature or light emission at the area.

In some embodiments, providing the first quantity of the fire suppressant agent at the first flow rate over the first time interval and providing the second quantity of the fire suppressant agent at the second flow rate over the second time interval facilitates a linear decrease of a temperature at the area after the second time interval.

Another implementation of the present disclosure is a controller for a fire suppression system. In some embodiments, the controller includes a processing circuit. In some embodiments, the processing circuit is configured to receive sensor data from a sensor in an area. In some embodiments, the processing circuit is configured to operate a delivery system to provide a first quantity of fire suppressant agent to the area at a first flow rate over a first time interval and operate the delivery system to provide a second quantity of fire suppressant agent to the area at a second flow rate over a second time interval in response to the sensor data. In some embodiments, the first flow rate is greater than the second flow rate.

In some embodiments, the first flow rate is constant over the first time interval and the second flow rate is constant over the second time interval.

In some embodiments, the first time interval is shorter than the second time interval.

In some embodiments, the first quantity of the fire suppressant agent is greater than the second quantity of the first suppressant agent.

In some embodiments, the processing circuit is configured to operate the delivery system to provide the second quantity of fire suppressant agent to the area at the second flow rate over the second time interval immediately after the first time interval or in response to providing the first quantity of the fire suppressant agent to the area.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

Overview

Referring generally to the FIGURES, a fire suppression system is shown, according to an exemplary embodiment. The fire suppression system includes an activation and delivery system, a piping system, and nozzles configured to discharge, spray, direct, etc., fire suppressant agent over an area. The activation and delivery system and/or the nozzles are configured to discharge the fire suppressant agent to the area at a variable flow rate. The activation and delivery system and/or the nozzles are configured to discharge the fire suppressant agent to the area at a first flow rate for a first time interval, and at a second flow rate (a decreased flow rate) for a second time interval. Advantageously, providing the fire suppressant agent at a first flow rate over a first time interval, and a decreased flow rate over a second time interval facilitates better fire suppression, decreases required amounts of fire suppressant agent, prolongs discharge time, and facilitates a more efficient system. Tanks, reservoirs, containers, capsules, cartridges, etc., configured to contain the fire suppressant agent can be decreased in size, since the fire can be suppressed with a decreased amount of fire suppressant agent. Advantageously, this reduces size and cost of the fire suppression system. Additionally, the fire suppression system can be used for oil-based fryers. Providing the fire suppressant agent at a first flow rate rapidly suppresses the fire to a manageable level. Providing the fire suppressant agent at a second (lower) flow rate after significantly suppressing the fire advantageously facilitates a consistent crust formulation along a top surface of the oil, thereby reducing the likelihoods of flare-ups and re-ignitions.

Fire Suppression System

Figure 1:
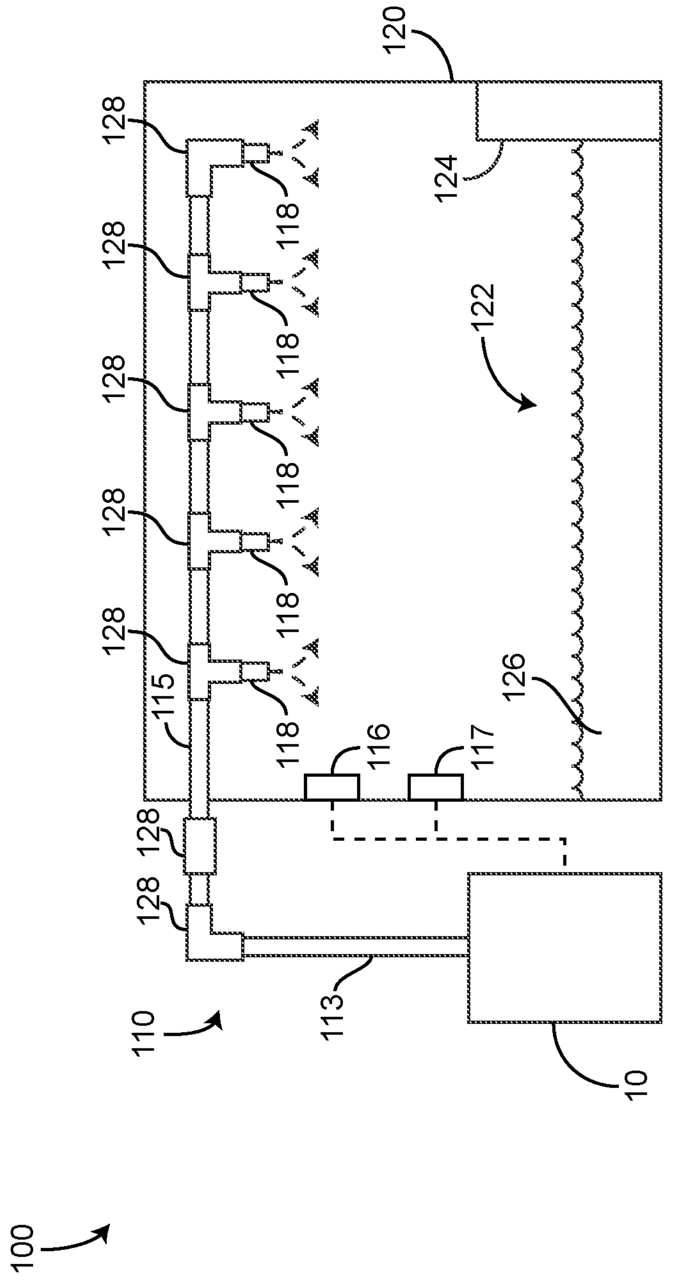
FIG. 1 is a drawing of a fire suppression system including a piping system, nozzles, and an activation and delivery system, configured to provide a fire suppressant agent to an area/space, according to an exemplary embodiment.

Referring to FIG. 1, a fire suppression system 100 is shown, according to an exemplary embodiment. Fire suppression system 100 includes an activation and delivery system 10, piping system 110, and nozzles, sprinklers, dispersion devices, etc., shown as nozzles 118. Activation and delivery system 10 may include one or more tanks, reservoirs, capsules, cartridges, etc., configured to contain/store a fire suppressant agent therewithin. Activation and delivery system 10 can include a prime mover (e.g., a compressed gas, a pump, etc.) configured to activate and deliver the fire suppressant agent within the one or more tanks and provide the fire suppressant agent to piping system 110. Fire suppression system 100 is configured to suppress a fire at area 122 within space 120. Space 120 may be a room of a building, an oven, a vehicle, an engine bay, a duct, an oil fryer, etc., or any other device, system, area, or space at which a fire may occur. In an exemplary embodiment, space 120 is an inner volume or a hood of a fryer. In some embodiments, multiple fire suppression systems 100 are used in combination with one another to cover a larger area (e.g., each in different rooms of a building).

Fire suppression system 100 can be used in a variety of different applications. Different applications can require different types of fire suppressant agent and different levels of mobility. Fire suppression system 100 is usable with a variety of different fire suppressant agents, such as powders, liquids, foams, or other fluid or flowable materials. Fire suppression system 100 can be used in a variety of stationary applications. By way of example, fire suppression system 100 is usable in kitchens (e.g., for oil or grease fires, etc.), in libraries, in data centers (e.g., for electronics fires, etc.), at filling stations (e.g., for gasoline or propane fires, etc.), or in other stationary applications. Alternatively, fire suppression system 100 can be used in a variety of mobile applications. By way of example, fire suppression system 100 can be incorporated into land-based vehicles (e.g., racing vehicles, forestry vehicles, construction vehicles, agricultural vehicles, mining vehicles, passenger vehicles, refuse vehicles, etc.), airborne vehicles (e.g., jets, planes, helicopters, etc.), or aquatic vehicles, (e.g., ships, submarines, etc.).

Activation and delivery system 10 is configured to provide the fire suppressant agent to piping system 110. Piping system 110 may include any plumbing components 128,113, 115 such as T-connectors, pipes 113/115, tubes, elbow connectors, nipple connectors, etc. Piping system 110 includes pipe 115 which extends through space 120 or above area 122 for which fire suppression is desired. Pipe 115 is fluidly coupled with multiple sprinklers, nozzles, dispersion devices, etc., shown as nozzles 118. Nozzles 118 are configured to receive the fire suppressant agent from activation and delivery system 10 via pipe 115 and deliver/provide (e.g., sprinkle, diffuse, spread, spray, etc.) the fire suppressant agent to area 122 and space 120. Nozzles 118 may be configured to hang above area 122 and provide the fire suppressant agent to area 122 therebelow (e.g., pendant sprinklers/nozzles). In other embodiments, nozzles 118 are upright sprinklers configured to protrude upwards from area 122.

Activation and delivery system 10 is shown receiving sensor information from one or more sensors such as optical sensor 116 and/or temperature sensor 117. Optical sensor 116 may be any of a photodetector, a fiber optic sensor, a proximity detector, an infrared sensor, a photoconductive device, a photovoltaic cell, a photodiode, etc., configured to monitor/measure/sense light intensity at space 120. Temperature sensor 117 may be any of a negative temperature coefficient thermistor, a resistance temperature detector, a thermocouple, etc., configured to monitor/measure/sense temperature at space 120. Other sensors may be used according to various alternative embodiments.

If space 120 is a fryer, space 120 may contain a fluid such as oil 126 therewithin. Temperature sensor 117 may be configured to measure a temperature of oil 126 or an ambient temperature within space 120. Likewise, optical sensor 116 may be configured to measure an intensity of light emitted from oil 126. If oil 126 exceeds a combustion temperature (e.g., a flashpoint), oil 126 can cause a fire at space 120. When fire suppressant agent is provided to oil 126 (e.g., grease) of an oil fryer, oil 126 saponificates with the fire suppressant agent forming a crust. The purpose of providing the fire suppressant agent is to consistently form the crust such that oil 126 cannot receive the air it needs to continue burning. In other embodiments, oil 126 is a fuel (e.g., gasoline, diesel fuel, automotive oil, etc.), or a fuel mixture. For example, if fire suppression system 100 is used in an automotive application, fire may occur due to a fuel or hydraulic line breaking and spraying fuel onto a superheated surface such as a turbocharger or a manifold (e.g., element 124). The fire suppressant agent can reduce the likelihood of a fire occurring by not only cooling oil 126 (or the fuel) but also cooling surfaces which may be at an elevated temperature such as element 124. The typical auto-ignition temperatures for diesel and hydraulic fluid are approximately 850 degrees Fahrenheit. Manifolds and turbo chargers are regularly over 1100-1200 degrees Fahrenheit, providing a sufficient temperature to ignite the diesel fuel or the hydraulic fluid. If oil 126 reaches the flashpoint (or if the ambient temperature exceeds a threshold value), temperature sensor 117 and/or optical sensor 116 can measure the light emitted and/or the temperature due to oil 126 igniting and activation and delivery system 10 can activate in response to the ignition of oil 126. Likewise, fire suppression system 100 can be configured to measure an ambient temperature in an automotive application and activate activation and delivery system 10 in response to detection of a fire (e.g., the ambient temperature exceeding a threshold value).

Activation and delivery system 10 can be configured to provide fire suppressant agent to piping system 110 in response to oil 126 igniting or detecting a fire at space 120. Activation and delivery system 10 can be configured to provide fire suppressant agent to piping system 110 in response to oil 126 exceeding a predetermined temperature, in response to oil 126 emitting light which may indicate ignition of oil 126, or in response to detecting a fire at space 120. Piping system 110 can be configured to provide the fire suppressant agent to oil 126 and/or area 122 via nozzles 118 in response to fire detection. Providing the fire suppressant agent to oil 126 may suppress the fire at oil 126. After the fire suppressant agent is provided to oil 126, a crust may form along a surface of oil 126 (e.g., due to saponification). The formed crust prevents oil 126 from receiving oxygen, thereby suppressing and extinguishing the fire. However, certain elements 124 may be configured to receive heat from oil 126. If oil 126 burns through the crust formed at the surface, oil 126 can re-ignite. The re-ignition of oil 126 can be facilitated by a high temperature of element 124 or by oil 126 burning through the crust and receiving oxygen therethrough. If oil 126 burns through the crust formed at the surface and is still at a high enough temperature, or is in contact with element 124, oil 126 can re-ignite. This can cause flash-ups after fire suppression system 100 has provided the fire suppressant agent to oil 126.

Some fire suppression systems provide the fire suppressant agent via nozzles 118 at a constant flow rate, thereby providing the entirety of available fire suppressant agent to oil 126 over a relatively short period of time. This can increase the likelihood of oil 126 re-igniting or flashing up, since the crust quickly forms and oil 126 and/or element 124 may retain a high temperature and quickly burn through the formed crust. However, fire suppression system 100 is configured to provide the fire suppressant agent to oil 126 and/or area 122 at a changing or dual flow rate, thereby ensuring that a consistent crust is formed along the surface of oil 126 and decreasing the likelihood of oil 126 re-igniting at a later time. This facilitates improved fire suppression, reduces the likelihood of oil 126 re-igniting, and can reduce the required volume of fire suppressant agent to adequately suppress the fire without oil 126 later flaring up. The crust holds vapors of oil 126 therewithin, prevents oxygen from being provided to oil 126, and cools oil 126. Advantageously, providing the fire suppressant agent at a first volumetric flow to quickly form a crust, and reducing the volumetric flow to maintain a consistent crust reduces the likelihood of flare-ups and/or re-ignitions of oil 126.

Variable Flow of Fire Suppressant Agent

Figure 2:
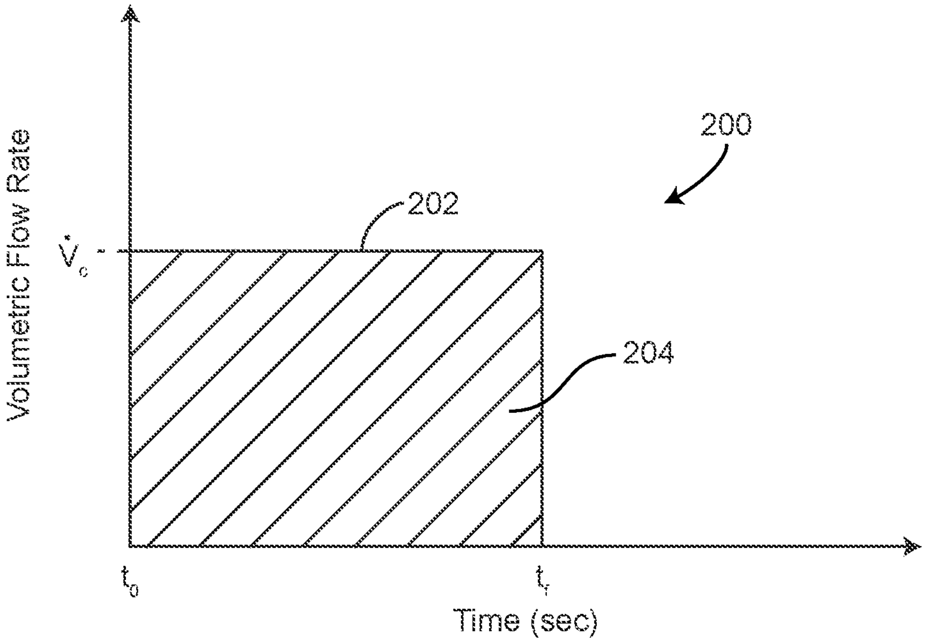
FIG. 2 is a graph of volumetric flow rate of the fire suppressant agent discharged from the nozzles of FIG. 1 with respect to time, showing a constant discharge rate, according to an exemplary embodiment.
Figure 3:
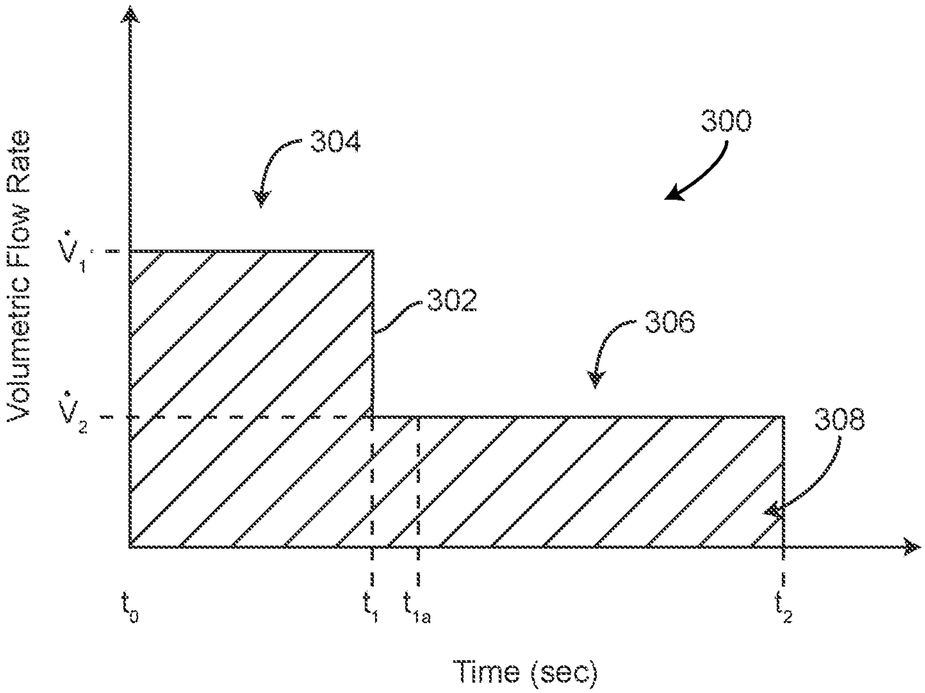
FIG. 3 is a graph of volumetric flow rate of the fire suppressant agent discharged from the nozzles of FIG. 1 with respect to time, showing a variable discharge rate, according to an exemplary embodiment.
Figure 4:
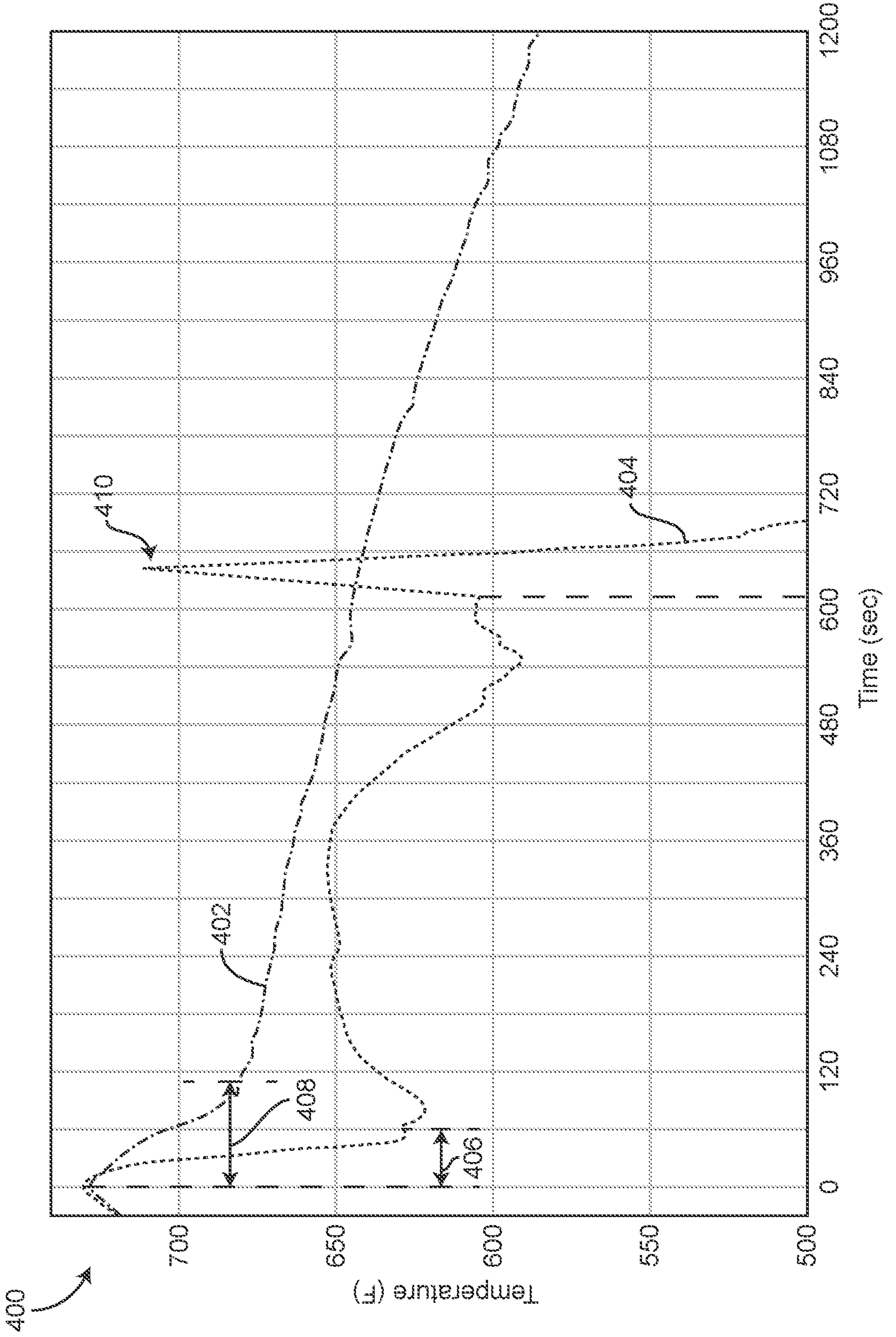
FIGS. 4-7 are graphs showing test results of temperature with respect to time for the constant discharge rate, and the variable discharge rate of the graphs of FIGS. 2-3, according to an exemplary embodiment.
Figure 5:
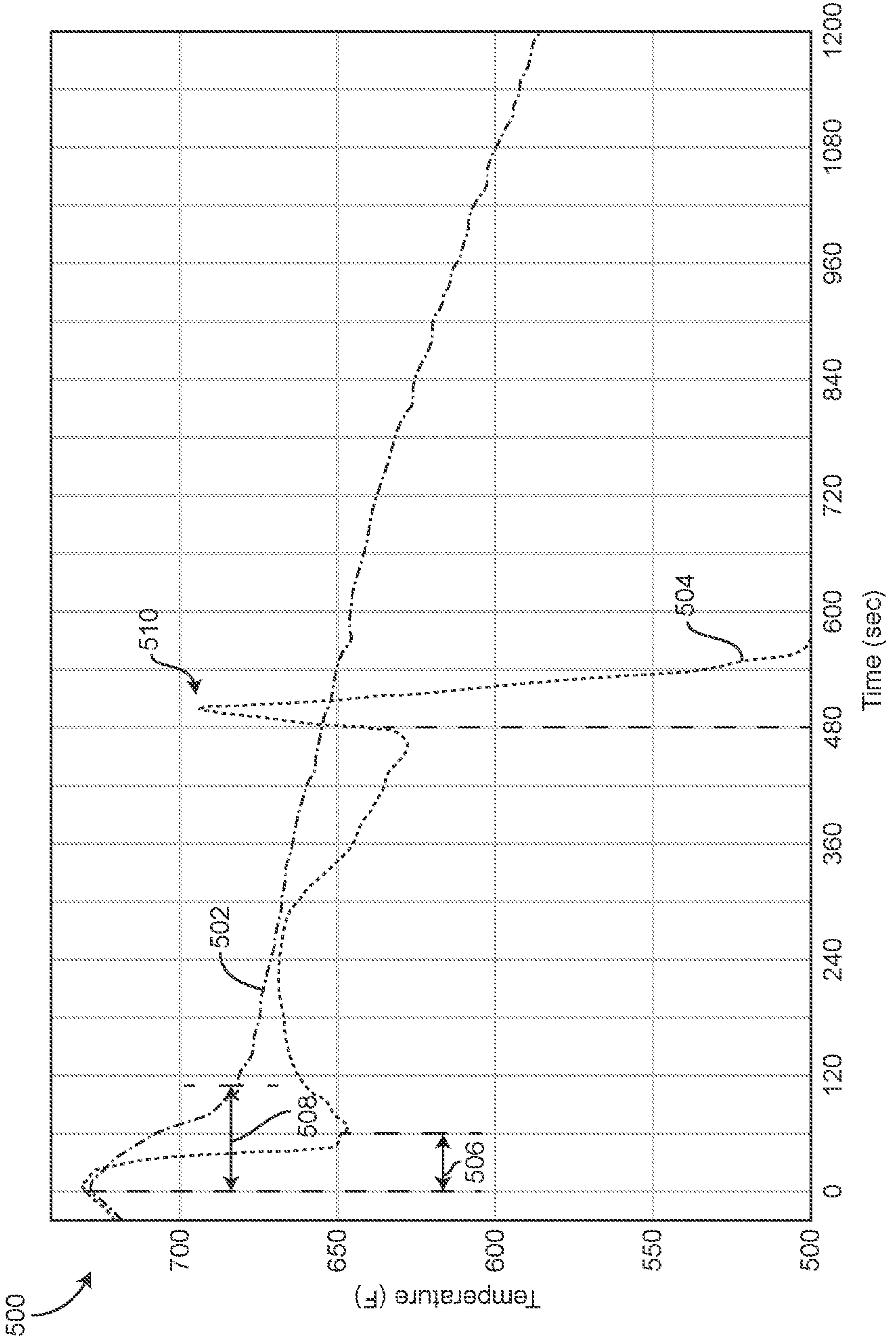
Figure 6:
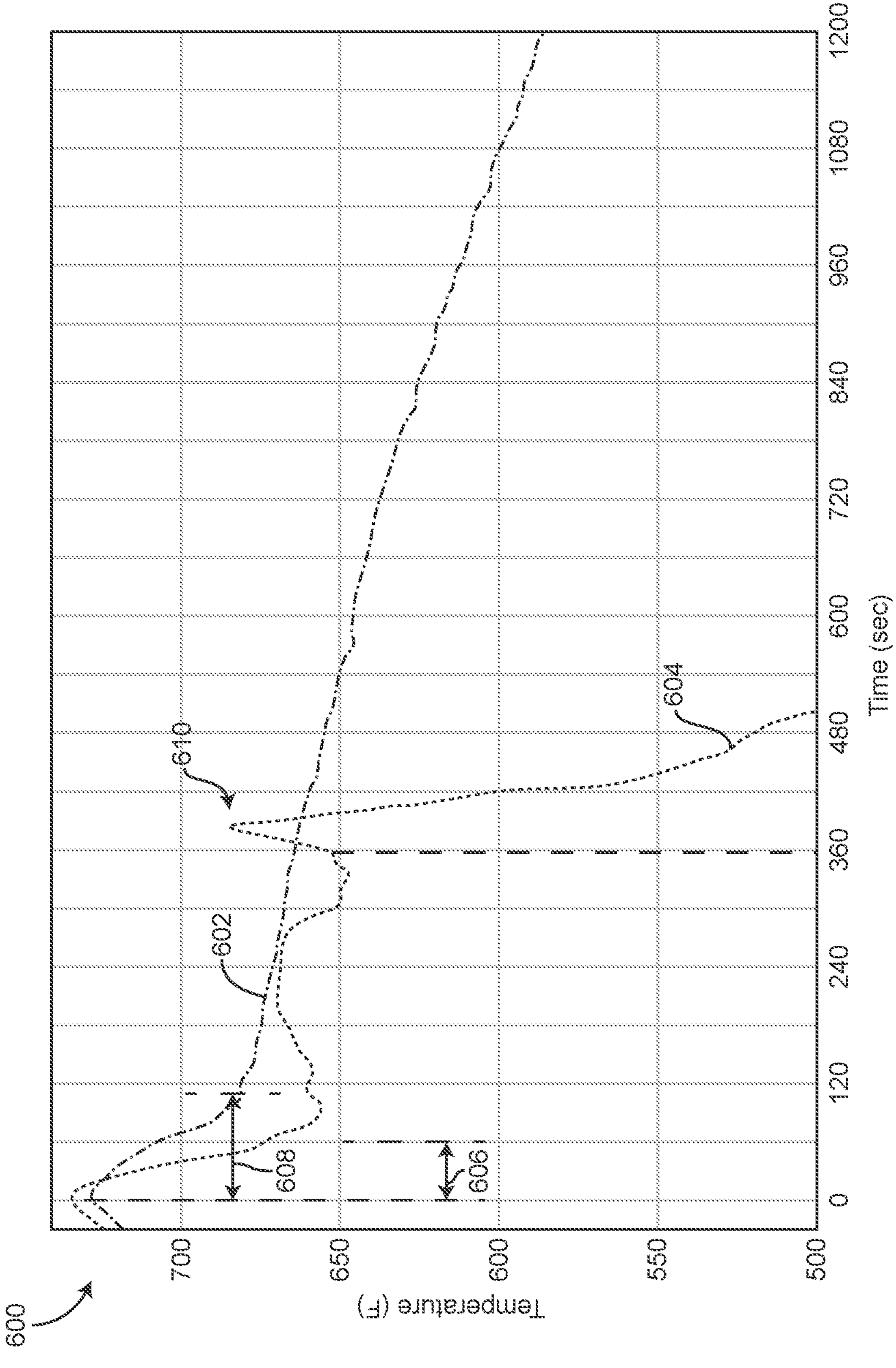
Figure 7:
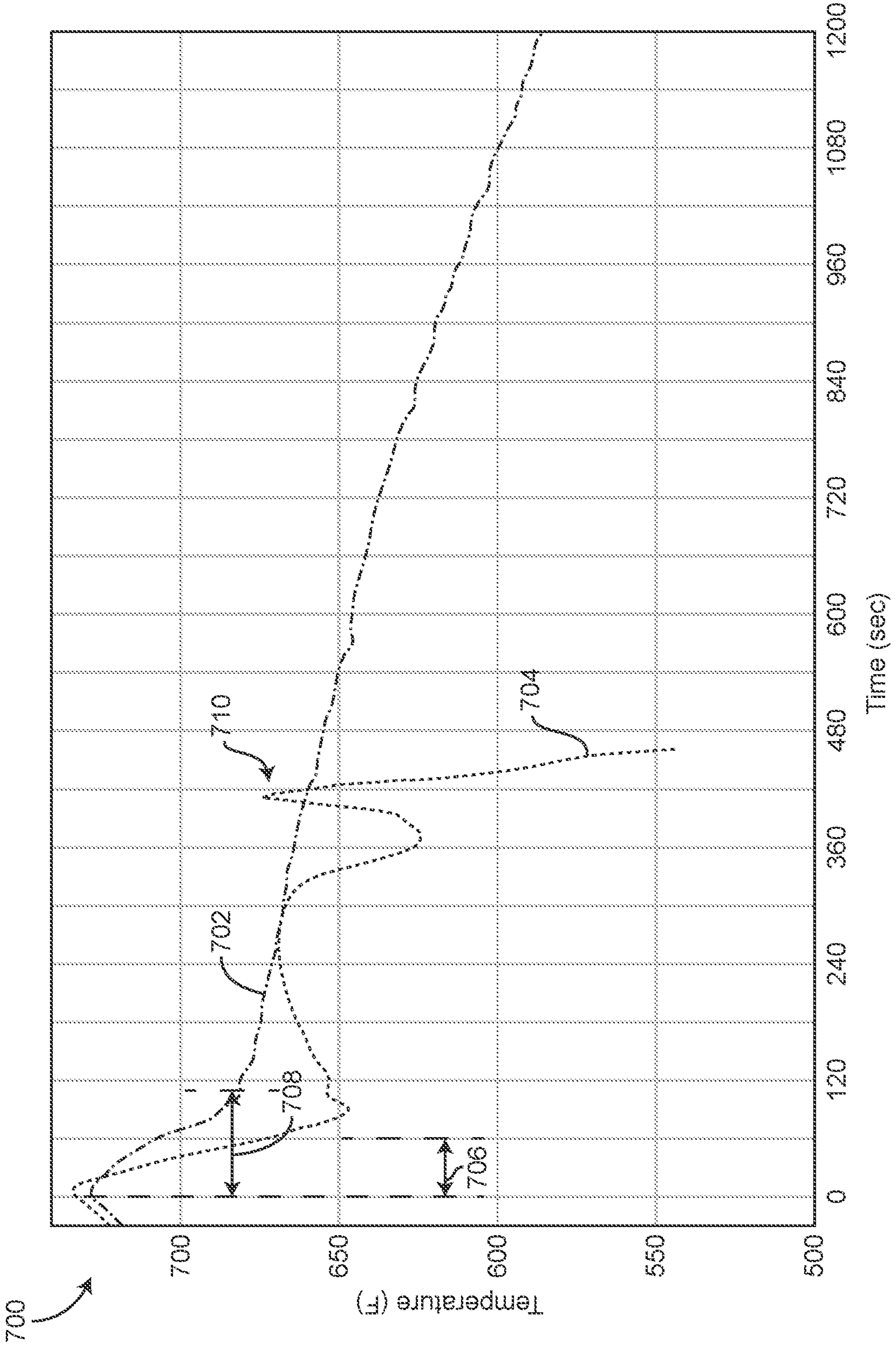

Referring now to FIGS. 2-3, graphs 200 and 300 show volumetric flow rate of fire suppressant agent emitted by nozzles 118 over time, according to various exemplary embodiments. Graph 200 shows fire suppressant agent provided at a constant volumetric flow rate $\dot{V}_c$, while graph 300 shows fire suppressant agent being provided at a first volumetric flow rate $\dot{V}_1$ over a first time interval, and a second volumetric flow rate $\dot{V}_2$ over a second time interval. Series 202 of graph 200 illustrates the volumetric flow rate $\dot{V}_c$ of the fire suppressant agent from $t=t_0$ to $t=t_f$. In an exemplary embodiment, $t_f=60$ seconds. Graph 200 represents the case when the fire suppressant agent is provided at a constant volumetric flow rate. Area 204 under series 202 indicates a total amount (e.g., a total volume, $V_1$) of fire suppressant agent provided over the time interval from $t=t_0$ to $t=t_f$. The total amount of fire suppressant agent, $V_1$, provided over the time interval from $t=t_0$ to $t=t_f$ may be defined as:

$$V_1 = \int_{t=t_0}^{t=t_f} \dot{V}(t)dt$$

where $\dot{V}(t)$ is the volumetric flow rate of fire suppressant agent as a function of time t. Since $\dot{V}(t)$ is constant from $t=t_0=0$ seconds to $t=t_f=60$ seconds, $V_1$ can be determined as:

$$V_1 = \int_{t=t_0}^{t=t_f} \dot{V}(t)dt = (t_f - t_0)\dot{V}_c$$

If $\dot{V}_c = 53.3$ mL/sec, $t_0 = 0$ seconds, and $t_f = 60$ seconds, $$\text{then } V_1 = (60 \text{ seconds} - 0 \text{ seconds})53.3\frac{\text{mL}}{\text{sec}} = 3200 \text{ mL}.$$

Graph 300 illustrates the case when the volumetric flow rate of provided fire suppressant agent is reduced at time $t_1$, according to an exemplary embodiment. Series 302 Time $t_1$ may be a time at which fires are typically suppressed after being provided the fire suppressant agent at a volumetric flow rate $\dot{V}_1$. Through testing, it can been determined that the fire suppressant agent must be provided at a sufficient volumetric flow rate (e.g., $\dot{V}_1$) for a time $\Delta t_{req}$ to adequately suppress the fire (e.g., to form a sufficient crust over oil 126). In some embodiments, time $t_1$ is approximately twice the required time (e.g., $t_1$ is approximately $2\Delta t_{req}$). In other embodiments, time $t_1$ is determined based on sensed/measured information (e.g., based on sensor values of optical sensor 116 and/or temperature sensor 117). This means that after a fire has been provided with fire suppressant agent at volumetric flow rate $\dot{V}_1$ (where $\dot{V}_1$ is a volumetric flow rate sufficient to suppress the fire) for $2\Delta t_{req}$, the fire has substantially been suppressed. Providing the fire suppressant agent after time $t_1$ at a lowered volumetric flow rate can result in a more consistent crust being formed on the surface of oil 126 by the fire suppressant agent, thereby reducing the likelihood of flare-ups. Therefore, a lower volumetric flow rate after time $t_1$ improves the fire suppression ability of fire suppression system 100 and reduces the likelihood of re-combustion/re-ignition. The increased consistency of the crust formed on the surface of oil 126 can reduce the required quantity of fire suppressant agent to suppress the fire. Advantageously, this can reduce costs associated with purchasing the fire suppressant agent, reduce the required volume of a tank which contains the fire suppressant agent, reduce size, etc.

Graph 300 includes first period 304 from $t=t_0$ to $t=t_1$ over which the fire suppressant agent is provided at volumetric flow rate $\dot{V}_1$ and second period 306 from $t=t_1$ to $t=t_2$ over which the fire suppressant agent is provided at a volumetric flow rate $\dot{V}_2$ where $\dot{V}_2<\dot{V}_1$. Area 308 indicates a total amount of fire suppressant agent provided over time $t=t_0$ to $t=t_2$. Area 308 can be determined similarly to area 204 above:

$$V_2 = \int_{t=t_0}^{t=t_2} \dot{V}(t)dt = \int_{t=t_0}^{t=t_1} \dot{V}(t)dt + \int_{t=t_1}^{t=t_2} \dot{V}(t)dt$$

Since $\dot{V}(t)$ is a constant value of $\dot{V}_1$ over first period 304 and a constant value of $\dot{V}_2$ over second period 306, the above equation reduces to:

$$V_2 = \int_{t=t_0}^{t=t_1} \dot{V}(t)dt + \int_{t=t_1}^{t=t_2} \dot{V}(t)dt = \dot{V}_1(t_1 - t_0) + \dot{V}_2(t_2 - t_1)$$

according to an exemplary embodiment. In some embodiments, $\dot{V}_1(t_1-t_0)=V_A$ and $\dot{V}_2(t_2-t_1)=V_B$.

In some embodiments, $\dot{V}_1=\dot{V}_c$ (see FIG. 2) and $\dot{V}_2<\dot{V}_1$. The volumetric flow rate $\dot{V}_2$ over second period 306 may be related to $\dot{V}_1$ with a percent reduction. For example, $\dot{V}_2$ may be 50% of $\dot{V}_1$. In other embodiments, $\dot{V}_2$ is 25% of $\dot{V}_1$. Additionally, the fire suppressant agent may be provided over a longer time interval, as shown in graph 300 with respect to graph 200. In some embodiments, $t_2>t_f$. However, even if $t_2>t_f$ and the fire suppressant agent is provided over a longer time interval as shown in graph 300 compared to graph 200, the volume of provided fire suppressant agent for the embodiment represented by graph 300 may be less than the volume of provided fire suppressant agent for the embodiment represented by graph 200. For example, assuming $$V_2 = 2000 \text{ mL } t_0 = 0 \text{ seconds, } \dot{V}_1 = \dot{V}_c = 53.3\frac{\text{mL}}{\text{sec}}, t_1 = 7 \text{ seconds,}$$

and $\dot{V}_2$ is 50% of $$\dot{V}_1\left(\text{i.e., } \dot{V}_2 = 26.67\frac{\text{mL}}{\text{sec}}\right),$$

$t_2$ can be determined as:

$$t_2 = \frac{V_2 - \dot{V}_1(t_1 - t_0)}{\dot{V}_2} + t_1 = \frac{2000 \text{ mL} - \left(53.3\frac{\text{mL}}{\text{sec}}\right)(7 \text{ sec} - 0 \text{ sec})}{26.67\frac{\text{mL}}{\text{sec}}} + 7 \text{ sec} = 68 \text{ seconds}$$

This indicates that a reduced quantity of fire suppressant agent can be used to suppress the fire and prevent the fire from re-igniting. Additionally, the reduced quantity of fire suppressant agent can be provided over a longer time interval (e.g., 68 seconds as opposed to 60 seconds). Since the majority of the fire suppression occurs over time interval from $t=t_0$ to $t=t_1$, graph 300 still illustrates providing the required amount of fire suppressant agent to suppress the fire. Advantageously, once the fire is fully suppressed, the volumetric flow rate is reduced (as shown in the embodiment represented by graph 300) to thereby decreases the likelihood of a flare-up occurring. Advantageously, the embodiment shown in graph 300 can be used to initially suppress the fire, and then provide additional fire suppressant agent at a lowered volumetric flow rate to decrease the likelihood of a flare-up occurring until the fire suppressant agent contained within a supply tank is completely discharged. Additionally, the volume of fire suppressant agent required for the embodiment as illustrated by graph 300 is reduced compared to the constant-volumetric flow embodiment illustrated by graph 200. This reduces the required amount of fire suppressant agent needed to suppress a fire and reduce flare-ups, thereby using the fire suppressant agent more efficiently and facilitating the use of smaller tanks and less fire suppressant agent.

If the same amount of fire suppressant agent is used in the changing flow rate application (graph 300) as compared to the constant flow rate application (graph 200), the overall time interval over which the fire suppressant agent is provided increases further, as shown below:

$$t_2 = \frac{V_2 - \dot{V}_1(t_1 - t_0)}{\dot{V}_2} + t_1 = \frac{3200 \text{ mL} - \left(53.3\frac{\text{mL}}{\text{sec}}\right)(7 \text{ sec} - 0 \text{ sec})}{26.67\frac{\text{mL}}{\text{sec}}} + 7 \text{ sec} = 113 \text{ seconds}$$

In some embodiments, the value of $t_1$ is determined based on measurements sensed by optical sensor 116 and/or temperature sensor 117. For example, the fire suppressant agent may be provided until the light intensity and/or the temperature measured by optical sensor 116 and temperature sensor 117 go below a predetermined threshold value. The time $t_2$ may be defined as a time at which the measurements of optical sensor 116 and/or temperature sensor 117 are below a predetermined threshold value, are below the predetermined threshold value for a required amount of time, meet one or more criteria, etc.

It should be noted that while graph 300 of FIG. 3 shows fire suppressant agent provided at volumetric flow rate $\dot{V}_1$ over first period 304 and at volumetric flow rate $\dot{V}_2$ over second period 306, additional periods of reduced volumetric flow of the fire suppressant agent may also be used. For example, fire suppressant agent may be provided at a third volumetric flow rate $\dot{V}_3$ over a third time period from $t=t_2$ to $t=t_3$ where $\dot{V}_3<\dot{V}_2$. The fire suppressant agent may be provided at any number of various volumetric flow rates (e.g., two as shown in FIG. 3, three, four, five, etc.). The consecutively occurring volumetric flow rates may decrease. Additionally, the fire suppressant agent may be provided at any number of volumetric flow rates from $t=t_0$ to $t=t_2$ or over a longer time duration than shown in graph 300 of FIG. 3. The volumetric flow rate may decrease by a predetermined quantity (e.g., 10 mL/sec such that $\dot{V}_2=\dot{V}_1-10$ mL/sec, $\dot{V}_3=\dot{V}_2-10$ mL/sec, $\dot{V}_4=\dot{V}_3-10$ mL/sec, etc.), or may decrease relative to the previous volumetric flow rate (e.g., $\dot{V}_2=0.5\dot{V}_1$, $\dot{V}_3=0.5\dot{V}_2$, $\dot{V}_4=0.5\dot{V}_3$, etc.). In some embodiments, the volumetric flow rate of consecutively occurring suppression time periods increases. For example, in some embodiments, if controller 106 receives sensor data from optical sensor 116 and/or temperature sensor 117 indicating that a flare-up has occurred, the volumetric flow rate may increase relative to a value of a previously provided volumetric flow rate of the fire suppressant agent (e.g., the volumetric flow rate may increase from $\dot{V}_2$ to $\dot{V}_3$ where $\dot{V}_3>\dot{V}_2$ in response to controller 106 receiving an indication from optical sensor 116 and/or temperature sensor 117 that a flare-up has occurred).

Additionally, while graphs 200 and 300 of FIGS. 2 and 3 show volumetric flow rate changing (e.g., decreasing) immediately, in some embodiments, the transition between various values of the volumetric flow rate is smooth. For example, graph 300 of FIG. 3 shows the volumetric flow rate V of the fire suppressant agent decreasing from $\dot{V}_1$ to $\dot{V}_2$ immediately at time $t=t_1$. However, the transition from $\dot{V}_1$ to $\dot{V}_2$ may occur over a time period. For example, the transition from $\dot{V}_1$ to $\dot{V}_2$ may occur from $t_1$ to $t_{1a}$ according to a linear decrease or a non-linear decrease. Likewise, if additional time periods of decreased volumetric flow rate are used, the transitions between consecutive decreases in the volumetric flow rate V may occur linearly, immediately, non-linearly, or a combination of the three.

Test Result Graphs

Referring now to FIGS. 4-7, graphs 400, 500, 600, and 700 illustrate test results of the constant flow of the fire suppressant agent (as represented by graph 200 in FIG. 2), and the non-constant flow of the fire suppressant agent (as represented by graph 300 in FIG. 3) over a time period, according to an exemplary embodiment. The Y-axis of graphs 400, 500, 600, and 700 indicates a measured temperature value, and the X-axis of graphs 400, 500, 600, and 700 indicates an amount of elapsed time in seconds. Graphs 400, 500, 600, and 700 illustrate test results comparing the constant flow case and the non-constant flow case for an oil fryer. Specifically, graphs 400, 500, 600, and 700 illustrate test results for a 28 inch deep and 18 inch wide oil fryer. Graphs 400, 500, 600, and 700 illustrate test results for the constant and the non-constant cases for a same amount of fire suppression fluid (e.g., $V_1=V_2$).

As shown in graphs 400, 500, 600, and 700, series 402, 502, 602, and 702 represents the non-constant or dual flow case, while series 404, 504, 604, and 704 represent a corresponding test with the constant flow of fire suppressant agent. The temperature value (Y-axis value) of series 402, 502, 602, and 702 initially starts at a high temperature (due to the presence of a fire), and quickly decreases due to the fire suppressant agent provided to the fire over time interval 406/506/606/706 (e.g., 60 seconds). Likewise, the temperature value (Y-axis value) of series 404, 504, 604, and 704 initially starts at a high temperature and decreases due to the fire suppressant agent provided over time interval 408/508/608/708 (e.g., 113 seconds, or some value greater than 60 seconds). While series 402/502/602/702 show temperature decreasing from 0 to 1200 seconds, series 404/504/604/704 illustrate a re-flash/re-ignition 410/510/610/710 some time after the fire suppressant agent has been provided. This is due to oil 126 burning through the crust and re-igniting. Since the fire suppressant agent is provided quickly and entirely to the oil, the likelihood of the oil burning through the crust and re-igniting is greater than compared to the case when the flow of the fire suppressant agent is reduced to provide the fire suppressant agent over a longer time period. Series 404/504/604/704 illustrate the benefits and reduced likelihood of flare-ups occurring after the fire suppressant agent has been provided to oil 126.

These test results indicate that the dual/changing flow application of the fire suppressant agent advantageously reduces the likelihood of a flare-up occurring after the fire suppressant agent has been provided. This is because the dual/changing flow application of the fire suppressant agent facilitates a more consistent crust formulation at the surface of oil 126. Additionally, it can be seen from FIGS. 4-7 that all of the test results for the dual/changing flow application of the fire suppressant agent meet the standard of decreasing the temperature by 60 degrees Fahrenheit over a time interval of 1200 seconds without any flare-ups. The volume of fire suppressant agent can also be decreased (e.g., to 2000 mL) and still meet the standard of decreasing the temperature by 60 degrees Fahrenheit or more over a time period of 1200 seconds without any flare-ups.

In some embodiments, time interval 408/508/608/708 is the overall discharge time for the dual/changing flow application of the fire suppressant agent. Likewise, time interval 406/506/606/706 is the overall discharge time for the constant flow application of the fire suppressant agent. As shown in FIGS. 4-7, the discharge time for the dual/changing flow application of the fire suppressant agent is increased when compared to the constant flow application of the fire suppressant agent (e.g., the discharge time increased from 60 seconds to 113 seconds).

Additionally, the amount of cooling (e.g., decrease in temperature) over the discharge time period for an automotive application is increased for the dual/changing flow application when compared to the constant flow application. As shown in FIGS. 4-7, the constant flow application of the fire suppressant agent (represented by series 404, 504, 604, and 704) includes many peaks and troughs (e.g., random elevations and decreases) in temperature. However, the dual/changing flow application of the fire suppressant agent (represented by series 402, 502, 602, and 702) decreases after the discharge time period in a near-linear manner, reducing the fluctuations in the temperature.

Figure 8:
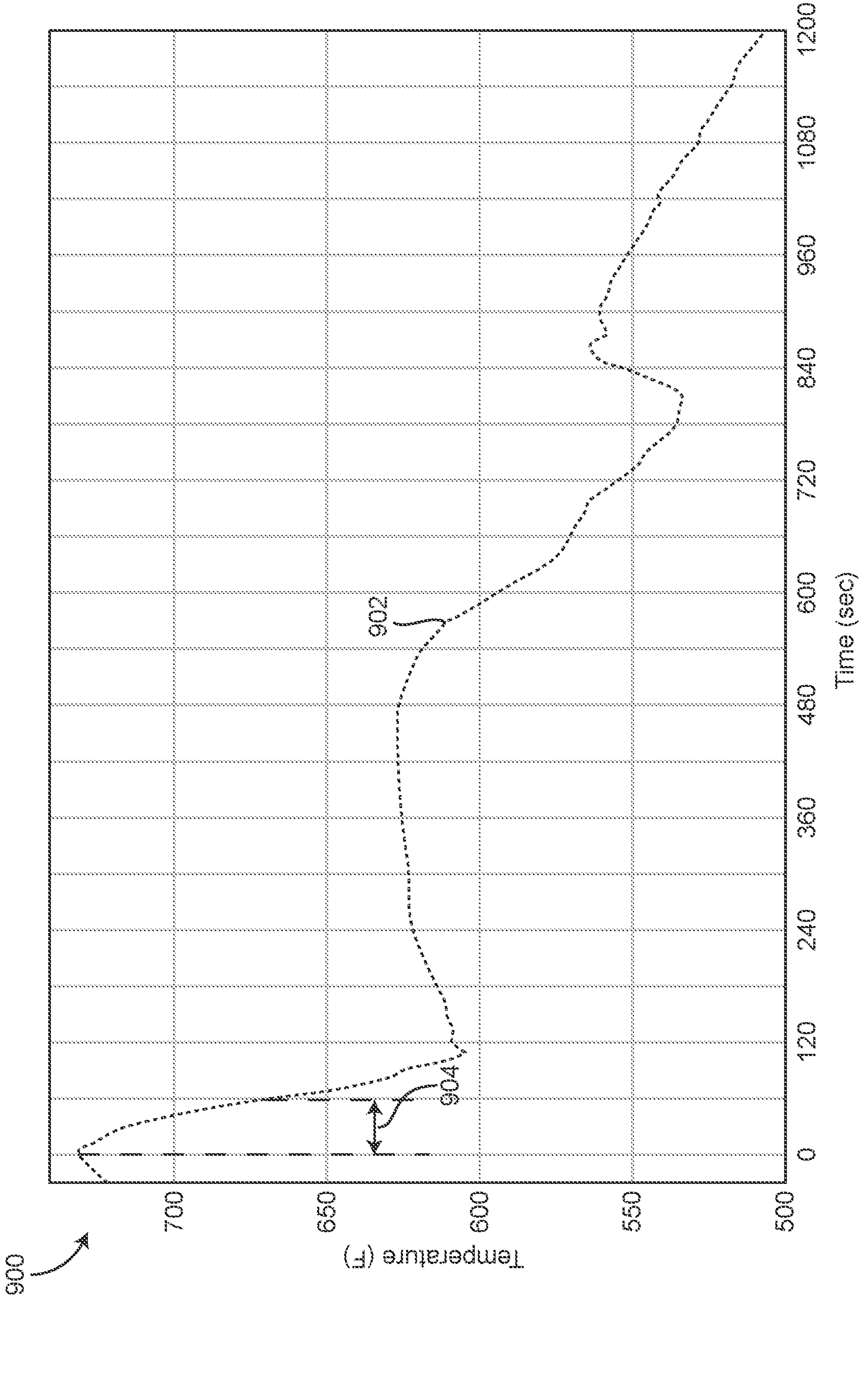
FIG. 8 is a graph showing test results of temperature with respect to time for the constant discharge rate of the graph of FIG. 2, according to an exemplary embodiment.

It should be noted that in some cases a constant flow application of fire suppressant agent may reduce the temperature by 60 degrees Fahrenheit over a time period of 1200 seconds without flare-ups, as shown in graph 900 of FIG. 8. Graph 900 of FIG. 8 includes series 902 which illustrates a successful test of the constant flow application of the fire suppressant agent. In graph 900, the fire suppressant agent is provided at a constant volumetric flow rate over discharge time interval 904 (e.g., the first 60 seconds). The temperature has an overall downward trend as shown in graph 900. However, series 902 still shows signs of temperature fluctuations which may cause flare-ups.

Figure 9:
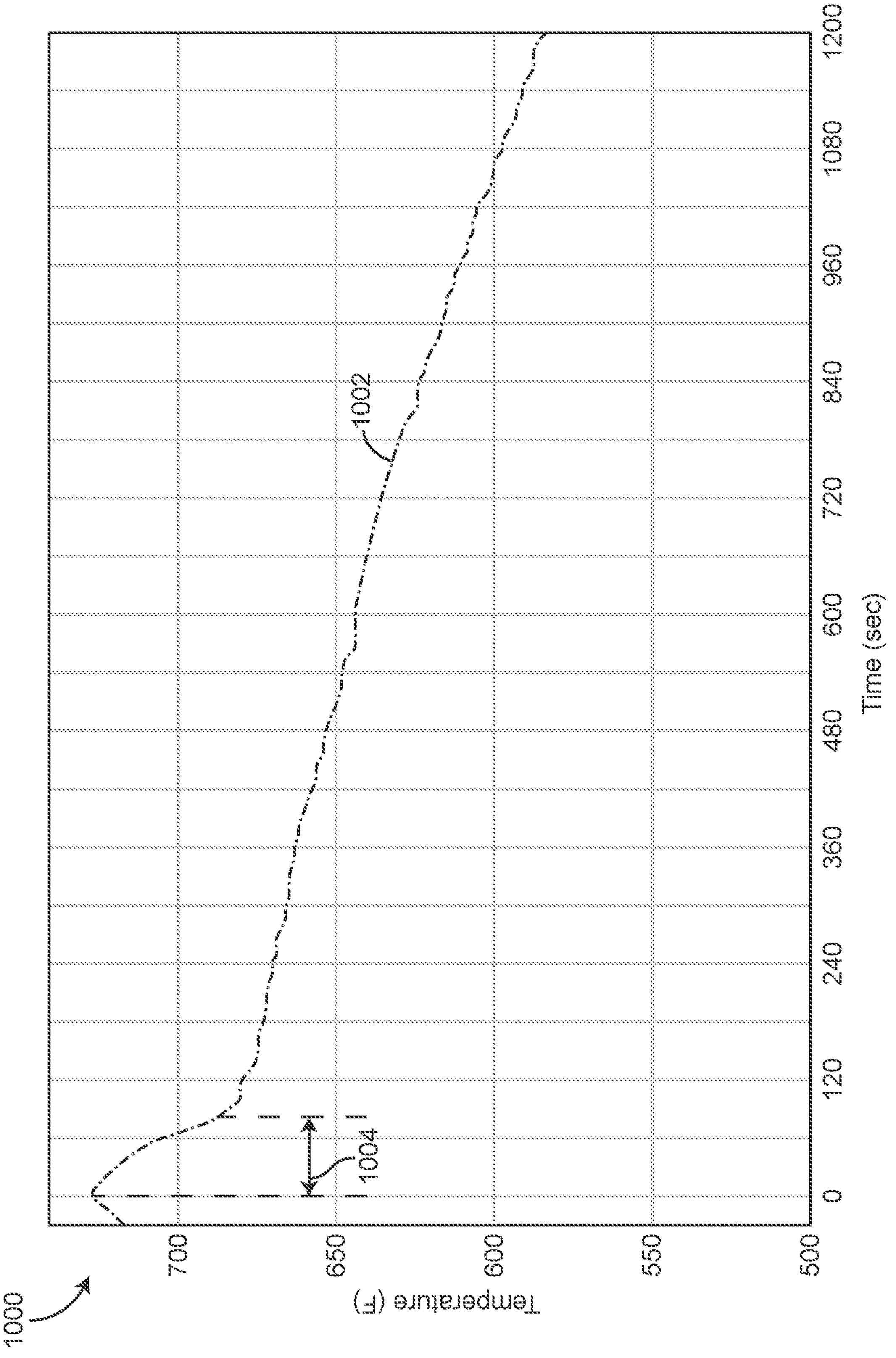
FIG. 9 is a graph showing test results of temperature with respect to time for the variable discharge rate of the graph of FIG. 3, according to an exemplary embodiment.

Referring now to FIG. 9, graph 1000 illustrates another test result of the dual/changing flow application of the fire suppressant agent, according to an exemplary embodiment. The fire suppressant agent is supplied over discharge time period 1004. The fire suppressant agent is supplied over a first portion of discharge time period 1004 at a first flow rate, and at a second flow rate (e.g., a reduced flow rate) over a second portion of discharge time period 1004. While both graph 1000 and 900 illustrate a successful suppression of the fire, it can be seen that series 1002 of graph 1000 has a near-linear decrease in temperature after discharge time period 1004, while series 902 of graph 900 includes rapid increases and decreases.

Activation and Delivery System

Figure 10:
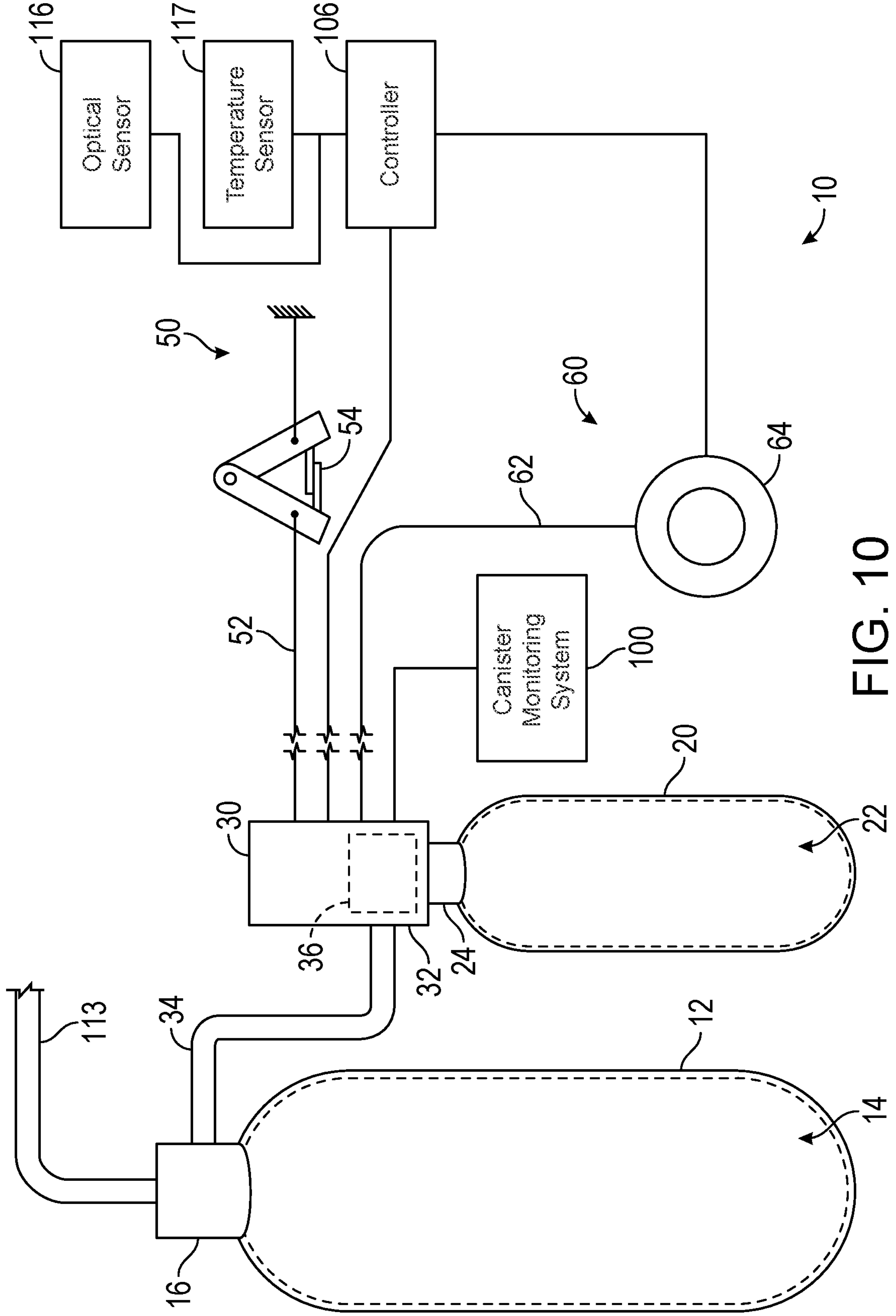
FIG. 10 is a schematic diagram of the activation and delivery system of FIG. 1, including a controller, according to an exemplary embodiment.

Referring now to FIG. 10, activation and delivery system 10 is shown according to an exemplary embodiment. In one embodiment, activation and delivery system 10 is a chemical fire suppression system. Activation and delivery system 10 is configured to dispense or distribute a fire suppressant agent onto and/or nearby a fire, extinguishing the fire and preventing the fire from spreading. Activation and delivery system 10 can be used alone or in combination with other types of fire suppression systems (e.g., a building sprinkler system, a handheld fire extinguisher, etc.).

Referring still to FIG. 10, activation and delivery system 10 includes a fire suppressant tank 12 (e.g., a vessel, container, vat, drum, tank, canister, cartridge, or can, etc.). Fire suppressant tank 12 defines an internal volume 14 filled (e.g., partially, completely, etc.) with fire suppressant agent. In some embodiments, the fire suppressant agent is normally not pressurized (e.g., is near atmospheric pressure). Fire suppressant tank 12 includes an exchange section, shown as neck 16. Neck 16 permits the flow of expellant gas into internal volume 14 and the flow of fire suppressant agent out of internal volume 14 so that the fire suppressant agent can be supplied to a fire.

Activation and delivery system 10 further includes a cartridge 20 (e.g., a vessel, container, vat, drum, tank, canister, cartridge, or can, etc.). Cartridge 20 defines an internal volume 22 configured to contain a volume of pressurized expellant gas. The expellant gas can be an inert gas. In some embodiments, the expellant gas is air, carbon dioxide, or nitrogen. Cartridge 20 includes an outlet portion or outlet section, shown as neck 24. Neck 24 defines an outlet fluidly coupled to internal volume 22. Accordingly, the expellant gas can leave cartridge 20 through neck 24. Cartridge 20 can be rechargeable or disposable after use. In some embodiments where cartridge 20 is rechargeable, additional expellant gas can be supplied to internal volume 22 through neck 24.

Activation and delivery system 10 further includes a valve, puncture device, or activator assembly, shown as actuator 30. Actuator 30 includes an adapter, shown as receiver 32, that is configured to receive neck 24 of cartridge 20. Neck 24 is selectively coupled to receiver 32 (e.g., through a threaded connection, etc.). Decoupling cartridge 20 from actuator 30 facilitates removal and replacement of cartridge 20 when cartridge 20 is depleted. Actuator 30 is fluidly coupled to neck 16 of fire suppressant tank 12 through a conduit or pipe, shown as hose 34.

Actuator 30 includes an activation mechanism 36 configured to selectively fluidly couple internal volume 22 to neck 16. In some embodiments, activation mechanism 36 includes one or more valves that selectively fluidly couple internal volume 22 to hose 34. The valves can be mechanically, electrically, manually, or otherwise actuated. In some such embodiments, neck 24 includes a valve that selectively prevents the expellant gas from flowing through neck 24. Such a valve can be manually operated (e.g., by a lever or knob on the outside of cartridge 20, etc.) or can open automatically upon engagement of neck 24 with actuator 30. Such a valve facilitates removal of cartridge 20 prior to depletion of the expellant gas. In other embodiments, cartridge 20 is sealed, and the activation mechanism 36 includes a pin, knife, nail, or other sharp object that actuator 30 forces into contact with cartridge 20. This punctures the outer surface of cartridge 20, fluidly coupling internal volume 22 with actuator 30. In some embodiments, activation mechanism 36 punctures cartridge 20 only when actuator 30 is activated. In some such embodiments, activation mechanism 36 omits any valves that control the flow of expellant gas to hose 34. In other embodiments, activation mechanism 36 automatically punctures cartridge 20 as neck 24 engages actuator 30.

Once actuator 30 is activated and cartridge 20 is fluidly coupled to hose 34, the expellant gas from cartridge 20 flows freely through neck 24, actuator 30, and hose 34 and into neck 16. The expellant gas enters fire suppressant tank 12 and forces fire suppressant agent from fire suppressant tank 12 out through neck 16 and into a conduit or hose, shown as pipe 113. In one embodiment, neck 16 directs the expellant gas from hose 34 to a top portion of internal volume 14. Neck 16 defines an outlet (e.g., using a syphon tube, etc.) near the bottom of fire suppressant tank 12. The pressure of the expellant gas at the top of internal volume 14 forces the fire suppressant agent to exit through the outlet and into pipe 113. In other embodiments, the expellant gas enters a bladder within fire suppressant tank 12, and the bladder presses against the fire suppressant agent to force the fire suppressant agent out through neck 16. In yet other embodiments, pipe 113 and hose 34 are coupled to fire suppressant tank 12 at different locations. By way of example, hose 34 can be coupled to the top of fire suppressant tank 12, and pipe 113 can be coupled to the bottom of fire suppressant tank 12. In some embodiments, fire suppressant tank 12 includes a burst disk that prevents the fire suppressant agent from flowing out through the neck 16 until the pressure within internal volume 14 exceeds a threshold pressure. Once the pressure exceeds the threshold pressure, the burst disk ruptures, permitting the flow of fire suppressant agent. Alternatively, fire suppressant tank 12 can include a valve, a puncture device, or another type of opening device or activator assembly that is configured to fluidly couple internal volume 14 to pipe 113 in response to the pressure within internal volume 14 exceeding the threshold pressure. Such an opening device can be configured to activate mechanically (e.g., the force of the pressure causes the opening device to activate, etc.) or the opening device may include a separate pressure sensor in communication with internal volume 14 that causes the opening device to activate.

Figure 11:
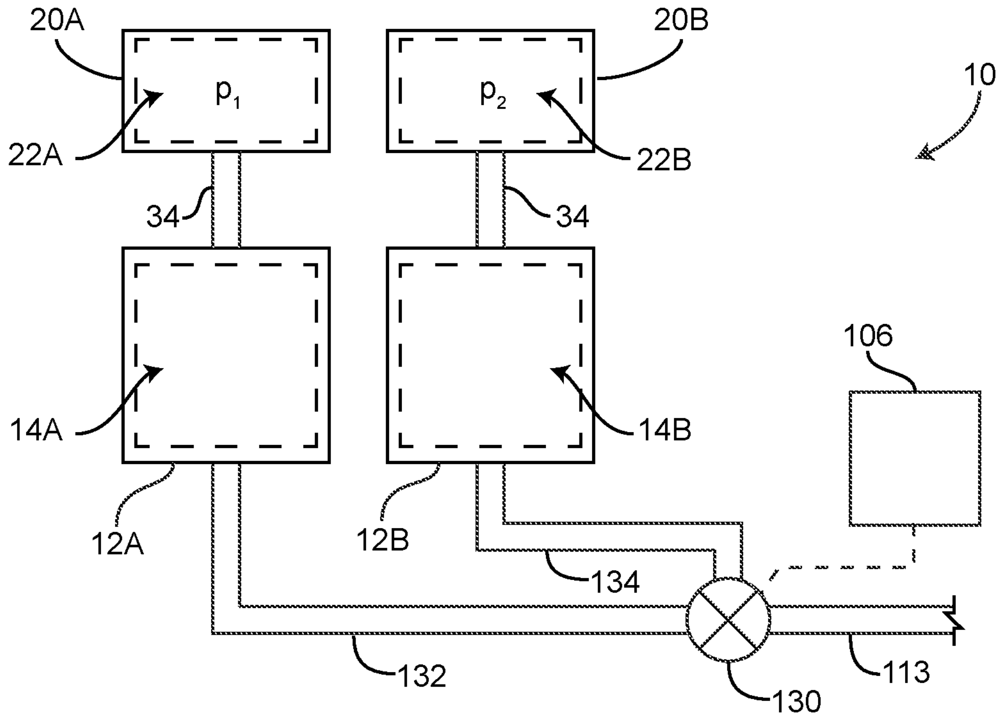
FIG. 11 is a schematic diagram of the activation and delivery system of FIG. 1, including a controller, according to another exemplary embodiment.

Referring now to FIGS. 1 and 11, pipe 113 is fluidly coupled to one or more outlets or sprayers, shown as nozzles 118. The fire suppressant agent flows through pipe 113 and to nozzles 118. Nozzles 118 each define one or more apertures, through which the fire suppressant agent exits, forming a spray of fire suppressant agent that covers a desired area. The sprays from nozzles 118 then suppress or extinguish fire within that area. The apertures of nozzles 118 can be shaped to control the spray pattern of the fire suppressant agent leaving nozzles 118. Nozzles 118 can be aimed such that the sprays cover specific points of interest (e.g., a specific piece of restaurant equipment, a specific component within an engine compartment of a vehicle, etc.). Nozzles 118 can be configured such that all of nozzles 118 activate simultaneously, or nozzles 118 can be configured such that only nozzles 118 near the fire are activated.

Activation and delivery system 10 further includes an automatic activation system 50 that controls the activation of actuator 30. Automatic activation system 50 is configured to monitor one or more conditions and determine if those conditions are indicative of a nearby fire. Upon detecting a nearby fire, automatic activation system 50 activates actuator 30, causing the fire suppressant agent to leave nozzles 118 and extinguish the fire.

In some embodiments, actuator 30 is controlled mechanically. As shown in FIG. 10, automatic activation system 50 includes a mechanical system including a tensile member (e.g., a rope, a cable, etc.), shown as cable 52, that imparts a tensile force on actuator 30. Without this tensile force, actuator 30 will activate. Cable 52 is coupled to a fusible link 54, which is in turn coupled to a stationary object (e.g., a wall, the ground, etc.). Fusible link 54 includes two plates that are held together with a solder alloy having a predetermined melting point. A first plate is coupled to cable 52, and a second plate is coupled to the stationary object. When the ambient temperature surrounding fusible link 54 exceeds the melting point of the solder alloy, the solder melts, allowing the two plates to separate. This releases the tension on cable 52, and actuator 30 activates. In other embodiments, automatic activation system 50 is another type of mechanical system that imparts a force on actuator 30 to activate actuator 30. Automatic activation system 50 can include linkages, motors, hydraulic or pneumatic components (e.g., pumps, compressors, valves, cylinders, hoses, etc.), or other types of mechanical components configured to activate actuator 30. Some parts of automatic activation system 50 (e.g., a compressor, hoses, valves, and other pneumatic components, etc.) can be shared with other parts of fire suppression system 100 (e.g., the manual activation system 60) or vice versa.

Actuator 30 can additionally or alternatively be configured to activate in response to receiving an electrical signal from automatic activation system 50. Referring to FIG. 10, automatic activation system 50 includes a controller 106 that monitors signals from one or more sensors, shown as temperature sensor 117 and optical sensor 116 (e.g., thermocouples, resistance temperature detectors, etc.). Controller 106 can use the signals from temperature sensor 58 to determine if an ambient temperature has exceeded a threshold temperature. Upon determining that the ambient temperature has exceeded the threshold temperature, controller 106 provides an electrical signal to actuator 30. Actuator 30 then activates in response to receiving the electrical signal.

Activation and delivery system 10 further includes a manual activation system 60 that controls the activation of actuator 30. Manual activation system 60 is configured to activate actuator 30 in response to an input from an operator. Manual activation system 60 can be included instead of or in addition to the automatic activation system 50. Both automatic activation system 50 and manual activation system 60 can activate actuator 30 independently. By way of example, automatic activation system 50 can activate actuator 30 regardless of any input from manual activation system 60, and vice versa.

As shown in FIG. 10, manual activation system 60 includes a mechanical system including a tensile member (e.g., a rope, a cable, etc.), shown as cable 62, coupled to actuator 30. Cable 62 is coupled to a human interface device (e.g., a button, a lever, a switch, a knob, a pull ring, etc.), shown as button 64. Button 64 is configured to impart a tensile force on cable 62 when pressed, and this tensile force is transferred to actuator 30. Actuator 30 activates upon experiencing the tensile force. In other embodiments, manual activation system 60 is another type of mechanical system that imparts a force on actuator 30 to activate actuator 30. Manual activation system 60 can include linkages, motors, hydraulic or pneumatic components (e.g., pumps, compressors, valves, cylinders, hoses, etc.), or other types of mechanical components configured to activate the actuator 30.

Actuator 30 can additionally or alternatively be configured to activate in response to receiving an electrical signal from manual activation system 60. As shown in FIG. 10, button 64 is operably coupled to controller 106. Controller 106 can be configured to monitor the status of a human interface device (e.g., engaged, disengaged, etc.). Upon determining that the human interface device is engaged, the controller provides an electrical signal to activate actuator 30. By way of example, controller 106 can be configured to monitor a signal from button 64 to determine if button 64 is pressed. Upon detecting that button 64 has been pressed, controller 106 sends an electrical signal to actuator 30 to activate actuator 30.

Automatic activation system 50 and manual activation system 60 are shown to activate actuator 30 both mechanically (e.g., though application of a tensile force through cables, through application of a pressurized liquid, through application of a pressurized gas, etc.) and electrically (e.g., by providing an electrical signal). It should be understood, however, that automatic activation system 50 and/or manual activation system 60 can be configured to activate actuator 30 solely mechanically, solely electrically, or through some combination of both. By way of example, automatic activation system 50 can omit controller 106 and activate actuator 30 based on the input from fusible link 54. By way of another example, automatic activation system 50 can omit fusible link 54 and activate actuator 30 using an input from controller 106.

Referring now to FIG. 11, activation and delivery system 10 is shown according to another embodiment. Activation and delivery system 10 as shown in FIG. 11 may include any or all of the components, features, activation mechanisms, etc., as described in greater detail above with reference to FIG. 10. Activation and delivery system 10 is configured to provide fire suppressant agent contained within internal volume 14*a* and internal volume 14*b* of fire suppressant tank 12*a* and fire suppressant tank 12*b*, respectively, to piping system 110 via pipe 113. Fire suppressant tank 12*a* and fire suppressant tank 12*b* are fluidly coupled to cartridge 20*a* and cartridge 20*b*, respectively. Cartridge 20*a* includes propellant gas within internal volume 22*a*. Likewise, cartridge 20*b* contains propellant gas within internal volume 22*b*. The propellant gas of cartridge 20*a* is pressurized at pressure $p_1$, while the propellant gas of cartridge 20*b* is pressurized at pressure $p_2$. Fire suppressant tank 12*a* is fluidly coupled to valve 130 via a tube, pipe, connector, hose, etc., shown as pipe 132. Fire suppressant tank 12*b* is similarly fluidly coupled to valve 130 via pipe 134. Valve 130 is configured to transition between various configurations to fluidly couple fire suppressant tank 12*a* to pipe 113 when in a first configuration and to fluidly couple fire suppressant tank 12*b* to pipe 113 when in a second configuration.

In an exemplary embodiment, controller 106 is configured to operably connect with valve 130 to transition valve 130 between the first configuration and the second configuration. For example, valve 130 may be configured to transition between the first configuration and the second configuration via an actuator which can be controlled by controller 106. Controller 106 is configured to transition valve 130 from the first configuration to the second configuration at time $t_1$.

Cartridge 20*a* is at pressure $p_1$ and cartridge 20*b* is at pressure $p_2$, with $p_1>p_2$. This results in the fire suppressant agent driven out of the corresponding fire suppressant tanks 12 being provided to pipe 113 at different volumetric flow rates. In some embodiments, $p_1$ is such that fire suppressant agent which exits fire suppressant tank 12*a* exits at a flow rate of $\dot{V}_1$. Likewise, $p_2$ may be such that fire suppressant agent which exits fire suppressant tank 12*b* exits at a flow rate of $\dot{V}_2$. Additionally, internal volume 14*a* of fire suppressant tank 12*a* may be substantially equal to the volume $V_A$ of fire suppressant agent provided over first period 304 (see FIG. 3), and internal volume 14*b* of fire suppressant tank 12*b* may be substantially equal to the volume $V_B$ of fire suppressant agent provided over second period 306.

Controller 106 may actuate valve 130 into the first configuration such that pipe 113 is fluidly coupled with fire suppressant tank 12*a*. The fire suppressant agent contained within internal volume 14*a* of fire suppressant tank 12*a* is pressurized by the propellant gas within internal volume 22*a* of cartridge 20*a* (the propellant gas at pressure $p_1$) and exits fire suppressant tank 12*a* at a flow rate of $\dot{V}_1$. Controller 106 maintains valve 130 in the first configuration such that the fire suppressant agent from fire suppressant tank 12*a* is provided to nozzles 118 at $\dot{V}_1$ until $t=t_1$. At time $t=t_1$, controller 106 transitions valve 130 into the second configuration such that fire suppressant tank 12*b* is fluidly coupled with pipe 113 and is configured to provide the fire suppressant agent therewithin to nozzles 118 via pipe 113. Since the propellant gas of cartridge 20*b* is at pressure $p_2$ which is less than pressure $p_1$, the fire suppressant agent exits fire suppressant tank 12*b* at a flow rate $\dot{V}_2$. In this way, controller 106 can control valve 130 such that the fire suppressant agent is provided to piping system 110 at a first flow rate $\dot{V}_1$ over first period 304, and a second flow rate $\dot{V}_2$, where $\dot{V}_2<\dot{V}_1$.

It should be noted that cartridge 20*a* and fire suppressant tank 12*a* may be configured similarly as described in greater detail above with reference to FIG. 10 such that cartridge 20*a* pressurizes fire suppressant tank 12*a*. Likewise, cartridge 20*a* and fire suppressant tank 12*a* may be similarly configured. Furthermore, other suitable configurations of suppressant tanks, cartridges, and corresponding pressures of expellant/propellant gas can be used to provide a desired first and second flow rate of the fire suppressant agent. For example, the volume, size, shape, etc., of fire suppressant tank 12*a* and fire suppressant tank 12*b* may be adjusted alone or in combination with adjustments to $p_1$ and $p_2$ such that cartridge 20*a* and fire suppressant tank 12*a* provide fire suppressant agent at $\dot{V}_1$ and cartridge 20*b* and fire suppressant tank 12*b* provide fire suppressant agent at $\dot{V}_2$, where $\dot{V}_2<\dot{V}_1$.

Figure 12:
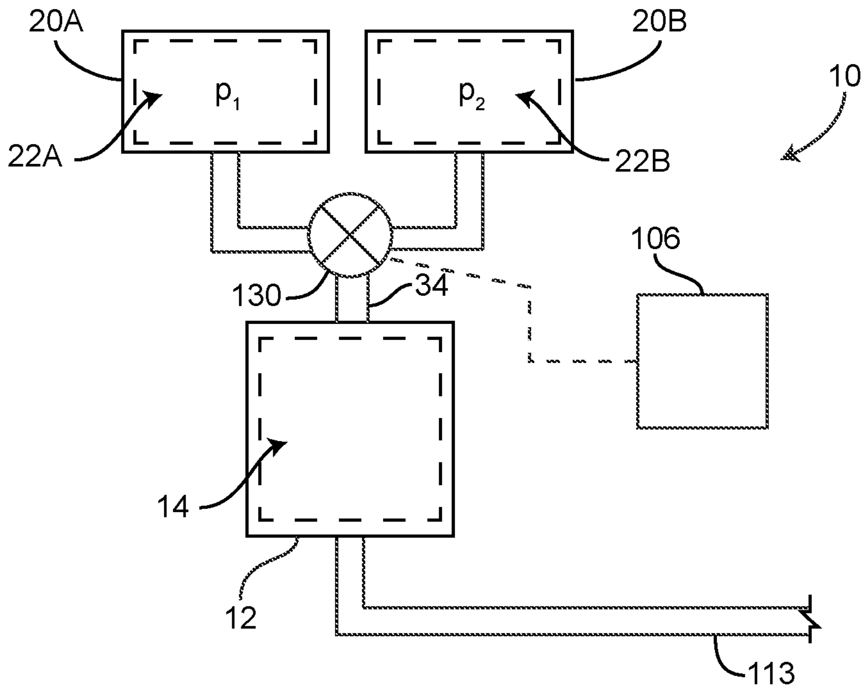
FIG. 12 is a schematic diagram of the activation and delivery system of FIG. 1, including a controller, according to another exemplary embodiment.

Referring now to FIG. 12, activation and delivery system 10 is shown in greater detail according to another embodiment. Activation and delivery system 10 as shown in FIG. 12 may share any of the features, configuration, components, etc., of activation and delivery system 10 as described in greater detail above with reference to FIG. 10. Additionally, activation and delivery system 10 as shown in FIG. 12 may include any of the features, configuration, components, etc., of activation and delivery system 10 as described in greater detail above with reference to FIG. 11.

Activation and delivery system 10 can include valve 130 fluidly coupled to cartridge 20*a* and cartridge 20*b*. Valve 130 is fluidly coupled to fire suppressant tank 12 such that the flow of expellant gas through valve 130 drives the fire suppressant agent contained within fire suppressant tank 12 through pipe 113 to piping system 110. Valve 130 is fluidly coupled upstream of fire suppressant tank 12 and is configured to provide expellant gas within cartridge 20*a* to fire suppressant tank 12 when in a first configuration and to provide expellant gas within cartridge 20*a* to fire suppressant tank 12 when in a second configuration. The expellant gas within cartridge 20*a* is at a pressure $p_1$ while the expellant gas within cartridge 20*b* is at a pressure $p_2$ where $p_1>p_2$. The pressure $p_1$ of the expellant gas within cartridge 20*a* is such that the fire suppressant agent is provided to piping system 110 at flow rate $\dot{V}_1$ when valve 130 is in the first configuration. Likewise, the pressure $p_2$ of the expellant gas within cartridge 20*b* is such that the fire suppressant agent is provided to piping system 110 at a flow rate $\dot{V}_2$ (e.g., 50% of $\dot{V}_1$) when valve 130 is in the second configuration, where $\dot{V}_2<\dot{V}_1$. In this way, transitioning valve 130 between the first and the second configuration controls the volumetric flow rate of fire suppressant agent provided to piping system 110. Controller 106 is shown communicably connected with valve 130. Controller 106 is configured to transition valve 130 between the first configuration and the second configuration to control the volumetric flow rate of fire suppressant agent provided to piping system 110. Controller 106 can be configured to transition valve 130 from the first configuration into the second configuration at a desired time (e.g., at $t_1$) to achieve variable/dual flow rate of the fire suppressant agent provided to piping system 110.

Figure 13:
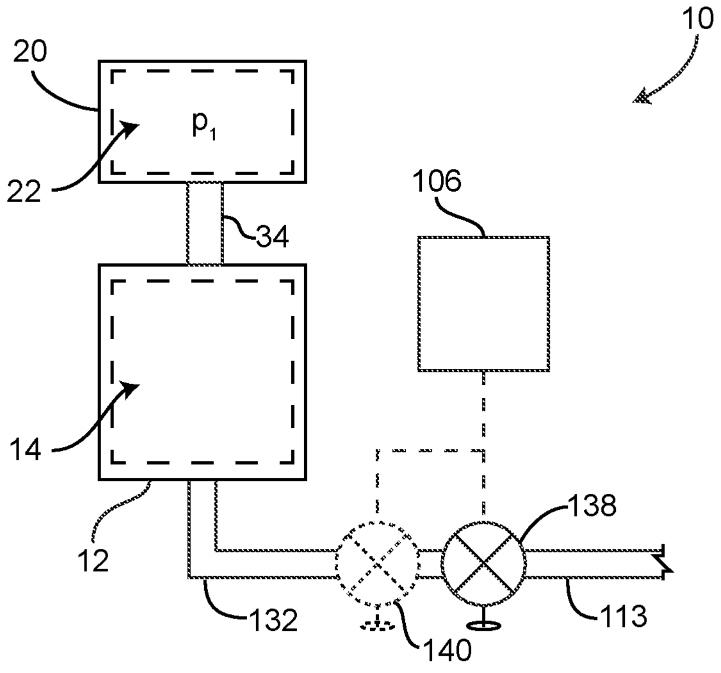
FIG. 13 is a schematic diagram of the activation and delivery system of FIG. 1, including a controller, according to another exemplary embodiment.

Referring now to FIG. 13, activation and delivery system 10 is shown, according to another embodiment. Activation and delivery system 10 includes cartridge 20 configured to contain expellant gas at a high pressure therewithin and fluidly couple with fire suppressant tank 12. When activation and delivery system 10 is activated, the expellant gas pressurizes and drives the fire suppressant agent contained within fire suppressant tank 12 to piping system 110 via pipe 113. Cartridge 20 includes internal volume 22 configured to contain the expellant gas therewithin. Fire suppressant tank 12 includes internal volume 14 configured to contain the fire suppressant agent therewithin. Internal volume 14 of fire suppressant tank 12 can be fluidly coupled with pipe 113 via pipe 132.

Activation and delivery system 10 is shown to include a regulator 138 disposed between pipe 132 and pipe 113. Regulator 138 is disposed downstream of fire suppressant tank 12 and is configured to control/adjust the flow rate of fire suppressant agent provided to pipe 113, according to some embodiments. In other embodiments, regulator 138 (and/or regulator 140) is disposed downstream of cartridge 20 and upstream of fire suppressant tank 12 and is configured to control/adjust the flow rate of expellant gas used to mobilize the fire suppressant agent within fire suppressant tank 12, thereby controlling/adjusting the flow rate of fire suppressant agent provided to pipe 113.

Regulator 138 may be a single state or a multi-stage regulator. In other embodiments, regulator 138 is an adjustable orifice regulator/valve/nozzle. If regulator 138 is a single stage regulator, regulator 140 (another single stage regulator) is included fluidly coupled with regulator 138 either upstream or downstream of regulator 138. Regulator 138 and/or regulator 140 can be any of pressure compensated flow regulators, temperature compensated flow regulators, etc. Regulator 138 and/or regulator 140 are configured to control/adjust the flow rate of fire suppressant agent provided to pipe 113 and piping system 110. Regulator 138 and/or regulator 140 may receive control signals from controller 106. The control signals may indicate when to adjust regulator 138 and/or regulator 140 to affect the flow rate of the fire suppressant agent provided to pipe 113 and piping system 110. For example, regulator 138 and/or regulator 140 can receive a control signal from controller 106 at a first time $t_0$ to produce volumetric flow rate Regulator 138 and/or regulator 140 can use the control signal to adjust such that the fire suppressant agent is provided to pipe 113 and piping system 110 at volumetric flow rate $\dot{V}_1$. Regulator 138 and/or regulator 140 may receive another control signal from controller 106 at a later time (e.g., at time $t_1$) indicating that the volumetric flow rate should be reduced to $\dot{V}_2$. Regulator 138 and/or regulator 140 can use the control signal to adjust such that the fire suppressant agent is provided to pipe 113 and piping system 110 at the volumetric flow rate $\dot{V}_2$. Regulator 138 and/or regulator 140 may include actuators configured to receive the control signals from controller 106 and adjust an operation of regulator 138 and/or regulator 140 to achieve the desired flow rate (e.g., $\dot{V}_1$ or $\dot{V}_2$).

Figure 14:
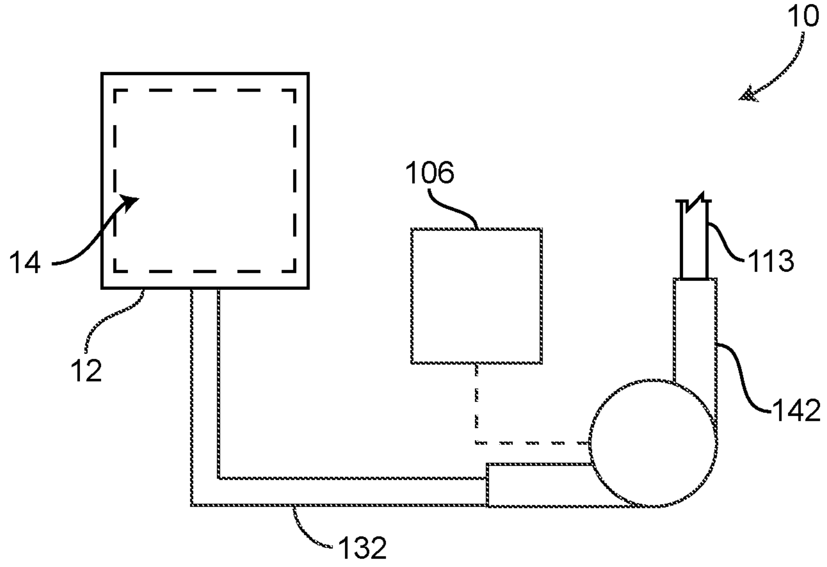
FIG. 14 is a schematic diagram of the activation and delivery system of FIG. 1, including a controller, according to another exemplary embodiment.

Referring now to FIG. 14, activation and delivery system 10 is shown, according to another embodiment. Activation and delivery system 10 includes fire suppressant tank 12 having internal volume 14 configured to contain fire suppressant agent therewithin. Fire suppressant tank 12 is fluidly coupled with pipe 113 (and piping system 110) via pipe 132 and pump 142. Pump 142 may be positioned upstream of fire suppressant tank 12 (as a discharge pump) to drive the fire suppressant agent through pipe 113 and piping system 110, or may be positioned downstream of fire suppressant tank 12 (as a suction pump) to draw the fire suppressant agent through pipe 132 and drive the fire suppressant agent through pipe 113 to piping system 110. Pump 142 may be a variable speed pump such that pump 142 is configured to provide the fire suppressant agent to piping system 110 at a variable or adjustable flow rate. Controller 106 is configured to provide control signals to pump 142 to adjust the flow rate of the fire suppressant agent provided to piping system 110. Controller 106 may provide a first set of control signals that cause pump 142 to operate such that the fire suppressant agent is provided to piping system 110 at a first flow rate (e.g., $\dot{V}_1$) and later provide a second set of control signals that cause pump 142 to operate such that the fire suppressant agent is provided to piping system 110 at a second flow rate (e.g., $\dot{V}_2$) where the second flow rate is less than the first flow rate (or greater than).

Referring again to FIG. 1, nozzles 118 may be spring loaded nozzles configured to discharge the fire suppressant agent at a first flow rate (e.g., $\dot{V}_1$) for a first time period and discharge the fire suppressant agent at a second flow rate (e.g., $\dot{V}_2$) for a second time period. Nozzles 118 may have a variable orifice configured to affect the discharge flow rate of the fire suppressant agent. The variable orifice may adjust to change the discharge flow rate of the fire suppressant agent. In some embodiments, the orifice adjusts automatically after a predetermined amount of time. In other embodiments, nozzles 118 are provided with an actuator configured to receive control signals from controller 106 and adjust the orifice such that the discharge flow rate of the fire suppressant agent is adjusted (e.g., from $\dot{V}_1$ to $\dot{V}_2$).

Figure 15:
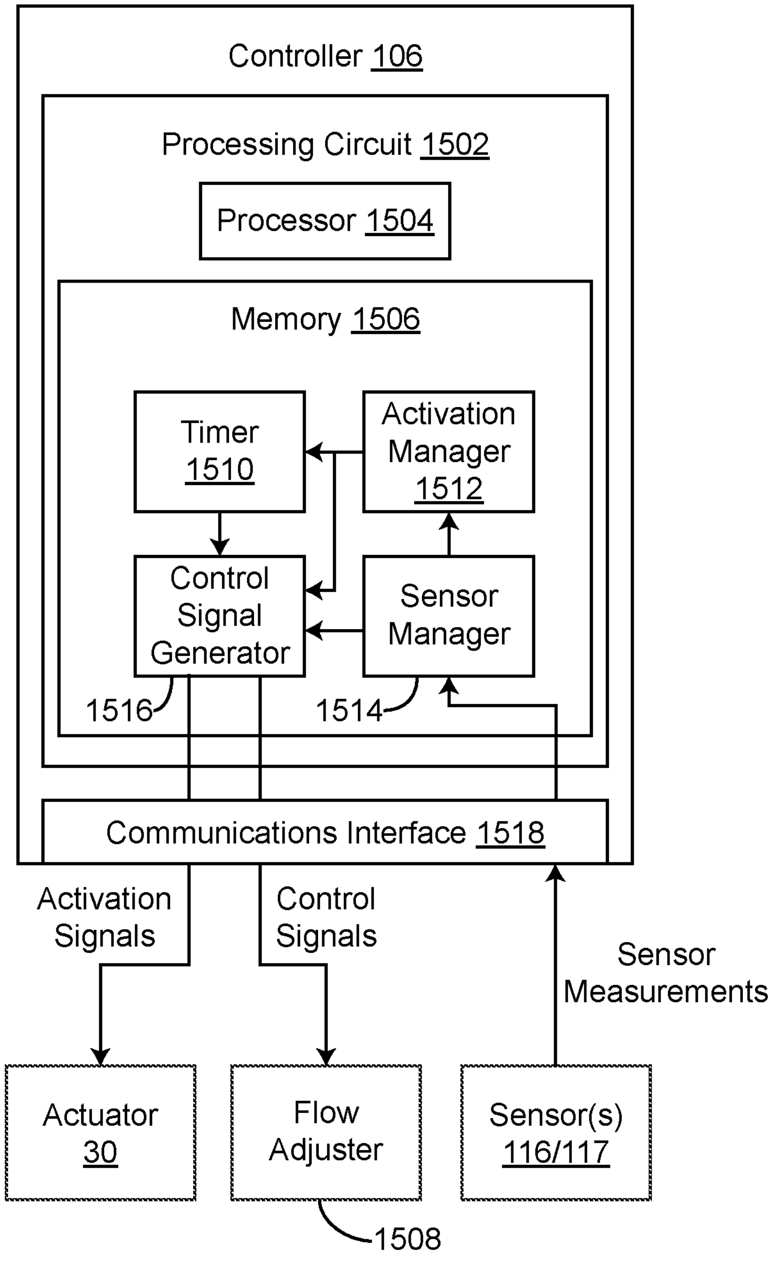
FIG. 15 is a block diagram of the controller of the activation and delivery system of FIGS. 10-14, according to an exemplary embodiment.

Referring now to FIG. 15, controller 106 is shown in greater detail, according to an exemplary embodiment. Controller 106 is shown to include a processing circuit 1502 including a processor 1504 and memory 1506. Processor 1504 may be a general purpose or specific purpose processor, an application specific integrated circuit (ASIC), one or more field programmable gate arrays (FPGAs), a group of processing components, or other suitable processing components. Processor 1504 is configured to execute computer code or instructions stored in memory 1506 or received from other computer readable media (e.g., CDROM, network storage, a remote server, etc.).

Memory 1506 may include one or more devices (e.g., memory units, memory devices, storage devices, etc.) for storing data and/or computer code for completing and/or facilitating the various processes described in the present disclosure. Memory 1506 may include random access memory (RAM), read-only memory (ROM), hard drive storage, temporary storage, non-volatile memory, flash memory, optical memory, or any other suitable memory for storing software objects and/or computer instructions. Memory 1506 may include database components, object code components, script components, or any other type of information structure for supporting the various activities and information structures described in the present disclosure. Memory 1506 may be communicably connected to processor 1504 via processing circuit 1502 and may include computer code for executing (e.g., by processor 1504) one or more processes described herein. When processor 1504 executes instructions stored in memory 1506, processor 1504 generally configures controller 106 (and more particularly processing circuit 1502) to complete such activities.

In some embodiments, controller 106 includes a data communications interface 1518 (e.g., a USB port, a wireless transceiver, etc.) configured to receive and transmit data. Communications interface 1518 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 1518 can include a USB port or an Ethernet card and port for sending and receiving data via an Ethernet-based communications link or network. In another example, communications interface 1518 can include a Wi-Fi transceiver for communicating via a wireless communications network or cellular or mobile phone communications transceivers.

Referring still to FIG. 15, controller 106 is shown communicably connected with sensors 116/117 (e.g., temperature sensor 117 and optical sensor 116) via communications interface 1518. Memory 1506 includes sensor manager 1514 configured to receive one or more sensor readings/measurements from sensors 116/117. Sensor manager 1514 can be configured to receive a signal associated with the sensor measurements and determine a value of the sensor measurements (e.g., in degrees Fahrenheit, intensity of light in kW, etc.) based on the received signals. Sensor manager 1514 is configured to provide the value of the sensor measurements to activation manager 1512 and/or control signal generator 1516. Sensor manager 1514 may provide control signal generator 1516 and/or activation manager 1512 with real-time sensor measurements.

Referring still to FIG. 15, memory 1506 is shown to include activation manager 1512, timer 1510, and control signal generator 1516. Activation manager 1512 is configured to monitor the values of the sensor measurements/readings and determine if fire suppression system 100 should be activated. For example, activation manager 1512 may monitor the values of the temperature measurements/readings, and if the value of the temperature measurements/readings exceeds a predetermined threshold value or is increasing at a rate over a predetermined threshold value, activation manager 1512 determines that fire suppression system 100 should be activated. Activation manager 1512 can provide control signal generator 1516 with an indication that fire suppression system 100 should be activated. Control signal generator 1516 can provide activation signals to actuator 30 to activate fire suppression system 100 in response to receiving the indication from activation manager 1512. Activation manager 1512 can also provide timer 1510 with the indication that fire suppression system 100 should be/has been activated. Timer 1510 can record a start time, $t_0$ at which fire suppression system 100 is activated. Timer 1510 is configured to track an amount of elapsed time since the start time $t_0$ and provide the amount of elapsed time to control signal generator 1516.

Control signal generator 1516 can also provide control signals to flow adjuster 1508. Flow adjuster 1508 may represent any of regulator(s) 138/140, valve 130, pump 142, etc., or any other controllable element described in greater detail hereinabove configured to adjust a flow rate of fire suppressant agent discharged from nozzles 118. In other embodiments, flow adjuster 1508 is a spring-loaded nozzle and/or an actuator associated with a spring-loaded nozzle, configured to adjust the spring-loaded nozzle (e.g., configured to adjust an orifice) to affect the flow rate of fire suppressant agent. In response to receiving the indication that fire suppression system 100 should be activated, or in response to fire suppression system 100 activating, control signal generator 1516 can provide flow adjuster 1508 with a control signal to discharge the fire suppressant agent from nozzles 118 at flow rate $\dot{V}_1$.

Control signal generator 1516 can monitor the elapsed time provided by timer 1510 since time $t_0$. Control signal generator 1516 can send another control signal to flow adjuster 1508 to decrease the flow rate (e.g., reduce to $\dot{V}_2$) in response to a predetermined amount of time passing since time $t_0$. For example, control signal generator 1516 can send the control signal to flow adjuster 1508 to decrease the flow rate at time $t_1$ (e.g., 7 seconds).

In other embodiments, control signal generator 1516 causes flow adjuster 1508 to adjust the flow rate based on values of the sensor measurements received from sensor manager 1514. For example, control signal generator 1516 may monitor the received temperature value (e.g., as sensed by temperature sensor 117) and compare the received temperature value to a threshold value. Once the received temperature value has decreased below the threshold value, control signal generator 1516 may cause flow adjuster 1508 to decrease the flow rate of the fire suppressant agent (e.g., decrease from $\dot{V}_1$ to $\dot{V}_2$). Likewise, control signal generator 1516 may monitor the received light intensity measurement from sensor manager 1514 (as measured by optical sensor 116). Once the received light intensity measurement decreases below a predetermined threshold value, control signal generator 1516 can cause flow adjuster 1508 to reduce the flow rate of the fire suppressant agent.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire suppression system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. For example, the configuration and orientation of neck 24 of FIG. 10 may be incorporated in cartridge 20*a* and/or cartridge 20*b* of FIG. 11. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fire suppression system comprising:

a delivery system configured to receive fire suppressant agent from a reservoir and provide the fire suppressant agent to an area at a flow rate, wherein the delivery system is further configured to:

provide a first quantity of fire suppressant agent to an area at a first flow rate during a first time interval; and provide a second quantity of fire suppressant agent to the area at a second flow rate during a second time interval, wherein the second flow rate is less than the first flow rate;

wherein the first and the second quantity of fire suppressant agent are provided to the area via a nozzle, wherein providing the first quantity of the fire suppressant agent at the first flow rate during the first time interval forms an initial crust of the fire suppressant agent to initially suppress a fire; and wherein providing the second quantity of the fire suppressant agent at the second flow rate over the second time interval forms additional crust of the fire suppressant agent to maintain suppression of the fire and reduce a likelihood of re-ignition of the fire, and wherein the delivery system comprises:

a first tank configured to store the first quantity of the fire suppressant agent;

a first cartridge configured to pressurize the first quantity of the fire suppressant agent in the first tank at a first pressure;

a second tank configured to store the second quantity of the fire suppressant agent;

a second cartridge configured to pressurize the second quantity of the fire suppressant agent in the second tank at a second pressure different than the first pressure;

a valve fluidly coupled with outlet conduits of both the first tank and the second tank; and a controller operatively coupled with the valve and configured to operate the valve to transition between a first position to provide the first quantity of the fire suppressant agent from the first tank to the area at the first flow rate during the first time interval and a second position to provide the second quantity of the fire suppressant agent from the second tank to the area at the second flow rate during the second time interval.

2. The fire suppression system of claim 1, wherein the system comprises a controller configured to control operation of the delivery system to provide the first quantity of fire suppressant agent in response to detecting a fire.

3. The fire suppression system of claim 1, wherein the delivery system is configured to automatically provide the second quantity of fire suppressant agent to the area at the second flow rate over the second time interval in response to at least one of:

discharging the first quantity of fire suppressant agent;

automatically providing the fire suppressant agent at the first flow rate for a predetermined amount of time;

reaching an end of the first time interval; and detecting a temperature change at the area.

4. The fire suppression system of claim 1, wherein the fire suppression system is a restaurant fire suppression system and is configured to provide the first quantity of fire suppressant agent and the second quantity of fire suppressant agent to a top surface of a fluid including fat or oil.

5. The fire suppression system of claim 1, wherein the fire suppression system is a vehicle fire suppression system comprising a heated element, wherein the first quantity of the fire suppressant agent is provided to the heated element to initially cool the heated element and the second quantity of the fire suppressant agent is provided to the heated element to maintain cooling of the heated element over the second time interval.

6. The fire suppression system of claim 1, further comprising at least one of an optical sensor configured to monitor light emitted at the area or a temperature sensor configured to monitor temperature at the area, wherein the delivery system is configured to activate to provide the first quantity and the second quantity of the fire suppressant agent in response to sensor data obtained from the optical sensor or the temperature sensor.

* * * * *